(12) United States Patent
Miyashita et al.

(10) Patent No.: US 6,678,230 B2
(45) Date of Patent: Jan. 13, 2004

(54) WAVEFORM EQUALIZER FOR A REPRODUCTION SIGNAL OBTAINED BY REPRODUCING MARKS AND NON-MARKS RECORDED ON A RECORDING MEDIUM

(75) Inventors: Harumitsu Miyashita, Osaka (JP); Shinichi Konishi, Nara (JP); Atsushi Nakamura, Osaka (JP); Takeshi Nakajima, Nara (JP); Junichi Minamino, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/984,351

(22) Filed: Oct. 29, 2001

(65) Prior Publication Data

US 2002/0067677 A1 Jun. 6, 2002

(30) Foreign Application Priority Data

Oct. 31, 2000 (JP) .................................. 2000-331973
Jun. 28, 2001 (JP) .................................. 2001-196034

(51) Int. Cl.$^7$ .............................................. G11B 7/005
(52) U.S. Cl. ................... 369/53.16; 369/47.21; 369/59.16; 714/32; 375/231; 360/65
(58) Field of Search ................ 369/53.16, 47.21, 369/53.33, 59.16, 124.12; 714/32; 375/231; 360/65

(56) References Cited

U.S. PATENT DOCUMENTS

| | | | | |
|---|---|---|---|---|
| 5,808,988 A | * | 9/1998 | Maeda et al. | 369/47.17 |
| 5,857,002 A | | 1/1999 | Melas | |
| 5,970,091 A | * | 10/1999 | Nishida et al. | 375/231 |
| 6,141,167 A | * | 10/2000 | Nishida et al. | 360/65 |
| 6,192,016 B1 | * | 2/2001 | Kim | 369/59 |
| 6,324,030 B1 | * | 11/2001 | Cheung et al. | 360/77.08 |
| 6,449,110 B1 | * | 9/2002 | DeGroat et al. | 360/46 |
| 6,480,447 B1 | * | 11/2002 | Wakabayashi et al. | 369/47.17 |
| 6,519,715 B1 | * | 2/2003 | Takashi et al. | 714/32 |

FOREIGN PATENT DOCUMENTS

JP 200 0-123487 4/2000

OTHER PUBLICATIONS

English Language Abstract of JP 2000–123487.
Hideki Nakamura et al., "High Density Optical Disk System Using New 3–15 Modulation", ITE Technical Report, vol. 24, No. 46, pp. 13–18, MMS2000–14, Jul. 2000.
G. David Forney, Jr., "Maximum–Likelihood Sequence Estimation of Digital Sequences in the Presence of Intersymbol Interference", IEEE Transactions on Information Technology, vol. IT–18, No. 3, pp 363–378, May 1972.
Tsuyoshi Oki et al., "New Signal Processing System for High Density Optical Disk", ITE Technical Report, vol. 24, No. 4, VIR2000–5, pp. 27–32, Jan. 20, 2000.

* cited by examiner

Primary Examiner—Gautam R. Patel
(74) Attorney, Agent, or Firm—Greenblum & Bernstein, P.L.C.

(57) ABSTRACT

Even with an asymmetric reproduction waveform, or under the noisy environment, an accurate equalizing error is found and temporary judgment value for adaptively controlling the coefficient of FIR filter is accurately outputted. A waveform equalizer for equalizing a waveform of a reproduction signal obtained by reproducing marks and non-marks recorded on a recording medium is provided. The equalizer includes: a detector which detects asymmetry of the reproduction signal arising from physical profiles of the marks and non-marks and outputs a detection signal representing asymmetric amount; a discriminator which discriminates the marks and non-marks based on the reproduction signal to output a discriminated signal; and a selector which calculates a first and second coefficient multiplied by the reproduction signal of the marks and non-marks based on the detection signal, which are different. The selector selects one of the first and second coefficients based on the discriminating signal.

3 Claims, 22 Drawing Sheets

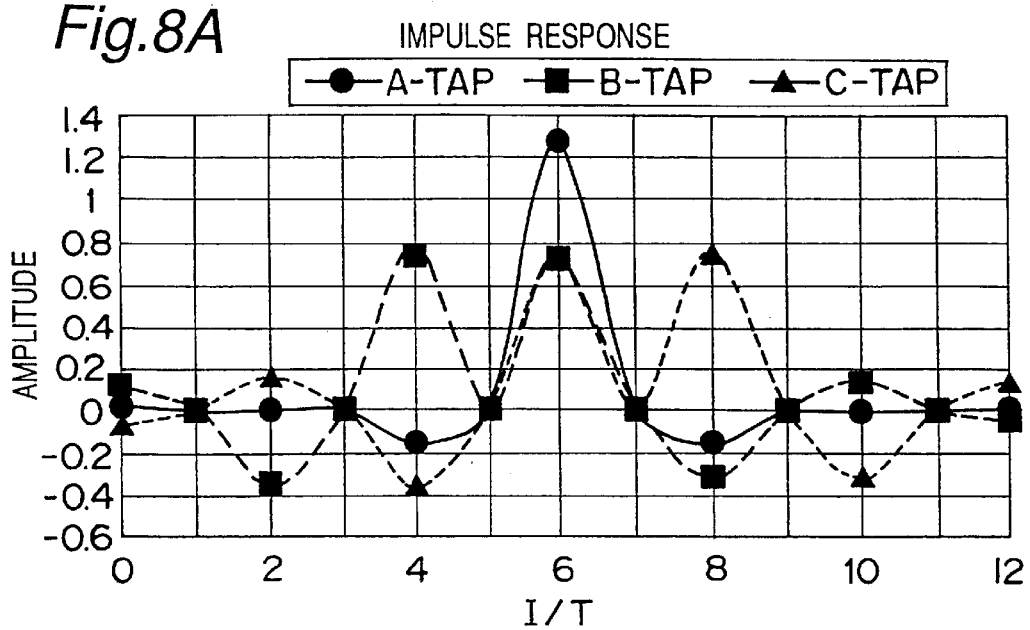
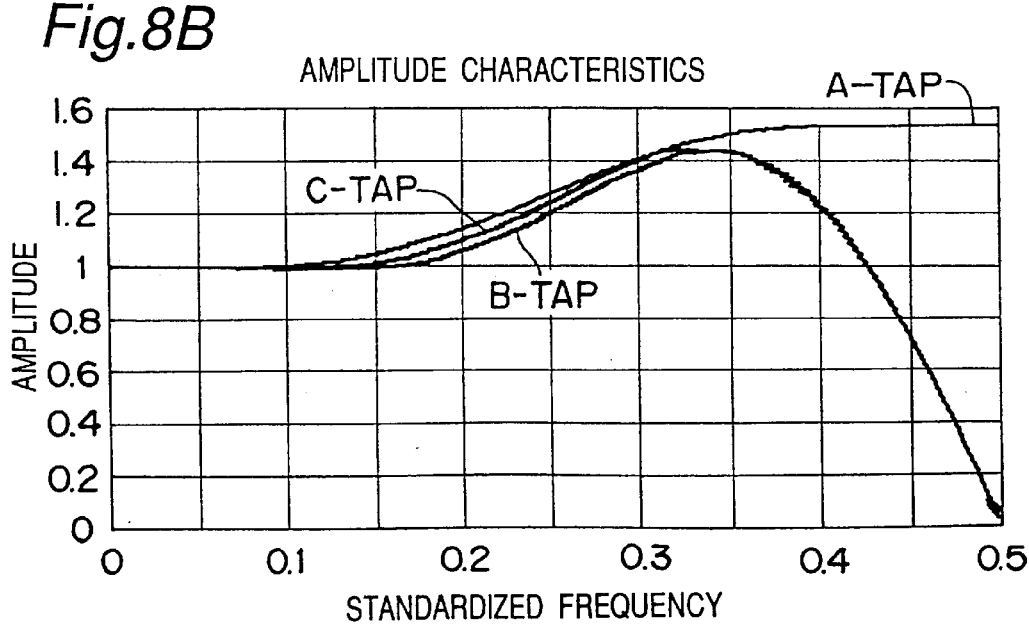

WAVEFORM EQUALIZER FOR A REPRODUCTION SIGNAL OBTAINED BY REPRODUCING MARKS AND NON-MARKS RECORDED ON A RECORDING MEDIUM

BACKGROUND OF THE INVENTION

1. Field of the Invention

This present invention relates to a technique for equalizing waveform of signals read from recording medium such as optical discs, etc.

2. Description on Related Art

In a information reproducing apparatus for reproducing information recorded on recording medium such as optical discs, a slice method has been adopted, in which a signal waveform level greater than a specified value is judged as "1" and that smaller than a specified value is judged as "0". However, in this method, it is difficult to reproduce data at a high reliability from the recording medium with remarkably improved recording density. Therefore, in recent years, attention is attracted to Partial Response Maximum Likelihood (hereinafter referred to as PRML) method that can reproduce the data at a high reliability. PRML method is a technique utilized for a signal processing technique of recording medium with increased density, which is utilized in, for example, a digital recording camera integrated type VTR, rewritable optical discs, not to mention a hard disk drive (hereinafter referred to as HDD). As the recording density increases, a need for reproducing data correctly from reproduction signals with low signal-to-noise (S/N) ratio or nonlinear reproduction signals is increased.

FIG. 16 is a block diagram of a general configuration of an information reproducing apparatus 181 using PRML method. First of all, an optical pickup 183 irradiates optical disc 182 with laser beam. Information reproducing apparatus 181 detects intensity of the reflected light, reads the information (data) recorded on optical disc 182, converts into electrical signals, and outputs to Front End Processor (hereinafter referred to as FEP) 184. FEP 184 amplifies the electrical signals read and adjusts its gain. FEP 184 further processes to remove noise components of unrequired high frequency band and to emphasize the required signal frequency band. The output signals from FEP 184 are converted to digital signals by analog/digital (A/D) converter 185 and entered into waveform equalizer 186. Waveform equalizer 186 waveform-equalizes waveforms of the digital signals to the preset PR characteristics. Maximum likelihood decoder 187 decodes waveform-equalized signals to PR characteristics and outputs as the reproduction data.

Waveform equalizer 186 of information reproducing apparatus 181 generates waveform in such a manner as to achieve the desired PR characteristics, that is, PR (3, 4, 4, 3) characteristics. FIG. 17 is a block diagram of an exemplary configuration of waveform equalizer 186. Waveform equalizer 186 is called as a transversal filter or Finite Impulse Response (FIR) filter. Waveform equalizer 186 generally includes a plurality of delay elements 192, a plurality of equalizing coefficients (coefficients A through E) for achieving the desired PR characteristics, a plurality of multipliers 193 for multiplying equalizing coefficients by the output of delay element 192, and an adder 194 for adding outputs of a plurality of multipliers 193.

In order to accurately equalize into desired PR characteristics, a technique to automatically adaptively control equalizing coefficients (taps) of FIR filter is adopted. This technique is effective for various stresses such as tilting of a disc, defocus of laser beam, off-track of optical head. Many adaptive control algorithms are known, including Least-mean square (LMS) algorithm, Normalized LMS algorithm, Recursive Least Square (RLS) algorithm, projection algorithm, neural network algorithm.

Now, the adaptive waveform equalizer using LMS algorithm will be briefly described. In this algorithm, a temporary judgment value used for LMS is required in order to calculate adaptive equalizing coefficients. This LMS algorithm utilizes a feedback operation for minimizing square errors between the "desired response" and the "response of transmission line." This "desired response" is a PR equalization target value. The "response of transmission line" is a digital reproduction signal entered from FIR filter and equalized into PR frequency characteristics. In LMS algorithm, a signal that represents a difference between the temporarily judged value and the digital reproduction signal value after equalization, which is obtained in the block of adaptively controlling the coefficients of FIR filter is called an equalization error signal.

The block that adaptively controls coefficients of FIR filter updates the equalizing coefficients of FIR filter as required to minimize the square value of the equalization error signal. This is called as an adaptive equalization. A formula for setting LMS equalizing coefficients is shown in the following formula (for example, S. Heikin: "Introduction to Adaptive Filters" Gendai Kogakusha):

$$w(n(T+1))=w(nT)+A \cdot e(nT) \cdot x(nT) \qquad \text{Eq. (1)}$$

(where, T=0, 1, 2, 3, ... )

w(nT) represents a present coefficient, w(n(T+1) is a coefficient to be updated, "A" is a tap gain, e(nT) is an equalization error, x(nT) is an input signal to FIR filter. "n" is a parameter for selecting update cycles of the coefficients. Based on Eq. (1) above, the equalizing coefficients of FIR filter is updated.

Now, asymmetry of optical disc 182 (FIG. 16) will be described. Asymmetry means absence of symmetry between pits and non-pits of the optical disc. In optical disc 182 (FIG. 16), information is recorded in the form of arrangement and length of microscopic emboss sections called pits. The pit has length of, for example, 3T, 5T when T denotes the reference length. Pits are arranged with spaces of 3T, 5T. The pit length is preferably exactly 3T, 5T. However, there are some deviations in pit length. This is because a master disc with deviations in pit length is manufactured as a result of, for example, slight deviation of power of recording light used for mastering an optical disc. When the recording power is not appropriate, each pit formed is slightly longer or shorter in the same amount from the standard value in front and behind in the length direction. That is, there is no symmetry between the pits and the non-pits, which is called as asymmetry. Hereinafter, in the present specification, relationships between the pits and the non-pits of the optical disc should be same as the relationships between recorded portions (marks) and unrecorded portions (spaces) of hard disk. Note that, for a read-only optical discs, terms "pit" and "non-pit" may be used and for recordable optical discs, the portion where the information is recorded (that is, portion intensely irradiated with laser) may be called as a "mark" and the region between marks a "space." In the present specification, terms "pit" and "mark" are synonymous. Terms "non-pit" and "space" and further "non-mark" are synonymous. In addition, a signal when the optical disc with no symmetry between pits and non-pits (that is, asymmetry) is reproduced is called as an asymmetric signal, and a signal when not an asymmetric optical disc is reproduced is called as a symmetric signal.

FIGS. 18A through 18C show simple models of asymmetry. In FIGS. 18A through 18C, 3T marks, 3T spaces, 5T marks, and 5T spaces pit arrangements are shown. In these figures, the reference length is 1T and a detection window width is adopted. FIG. 18B is a standard pit arrangement, and both marks and spaces are symmetric. As against FIG. 18B, FIG. 18A shows marks, each of which has length uniformly shorter than that shown in FIG. 18B by length x. On the other hand, FIG. 18C shows marks, each of which has length uniformly longer than that shown in FIG. 18B by length y. In either case shown in FIGS. 18A and 18C, no symmetry is observed in both marks and spaces. Because this asymmetry is also caused by fluctuations of laser wavelength, in general, it is difficult to adjust and maintain symmetry between pits and non-pits at the time of recording.

Now, the description is made on the specific hardware configuration and procedure for binarizing the analog data signal (reproduction signal) read from the optical disc. FIG. 19 is a block diagram of the configuration of the PRML detector 210. PRML detector 210 carries out adaptive equalization and updates the equalizing coefficients of FIR filter from time to time. First of all, A/D converter 221 of PRML detector 210 converts the reproduction signal from analog to digital. Phase comparator 222 generates binary data with a certain threshold value used as a reference. Then, PR temporary judging section 223 receives the binary data. PR temporary judging section 223 temporarily judges the desired value of PR and outputs coefficient adaptive controller 224. The desired value of PR method can be determined based on the amplitude zero-cross information obtained at phase comparator 222 (for example, see Screen Image Information Media Society Technical Report (ITE Technical Report Vol. 24, No. 46, pp. 13–18 MMS2000-14 (July 2000)). Then, coefficient adaptive controller 224 updates the equalizing coefficient (tap) of FIR equalizer 225 using the adaptive algorithm described before. Viterbi decoder 226 converts the waveform equalized into the specified PR at FIR equalizer 225 into the binary data.

The clock used at A/D converter 21 is generated as a result of specified processing of phase comparator 22 which detects phase difference from the output of A/D converter 21 and by loop filter, DAC for converting digital signal to analog signal and voltage control transmitter VCO (all not illustrated).

FIG. 20 is a block diagram of the configuration of PRML detector 220. PRML detector 220 outputs the judgment value by PR (1, 1) equalization using the output of the FIR equalizer, and calculates the desired value of PR (a, b, b, a) equalization in the FIR equalizer using the judgment value, which is disclosed in, for example, Japanese Laid-open Publication No. 2000-123487. A/D converter 231 converts the reproduction signal from analog signal to digital signal. FIR equalizer 32 carries out the specified PR equalization for the digital signal. PR temporary judging section 233 temporarily judges the desired value of PR method using binarized data of output of FIR equalizer 32 and outputs to coefficient adaptive controller 234. Coefficient adaptive controller 234 uses the temporary judgment value and updates taps of FIR equalizer 232. PRML detector 220 can suppress the probability for occuring judgment errors to a low level by reducing the judgment threshold value.

Conventionally, since there used to be questions (1) and (2) as shown below, it was unable to obtain properly binarized reproduction signals. That is, (1) When there is no symmetry between the pits and the non-pits in an optical disc (that is, asymmetry), the performance of PRML degrades. In other words, information reproducing apparatus 181 using the conventional PRML generates errors by asymmetrical reproduction signals.

Problem (1) above can be described as follows. FIG. 21A and FIG. 21B show histograms of output signals of A/D converter 185 in information reproducing apparatus 81 (FIG. 16). The abscissa is the reproduction signal level, while the frequency of signal level is taken as ordinate. This waveform example uses the 8–16 modulation used in the DVD (Digital Versatile Disc) specifications. That is, the reproduction waveform has 3T-14T (including sync code) mark length and space length.

The phase error is detected with the center of the reproduction signal level used as a reference (for example, central value 64 (40h) of expressible 0–128 when the number of effective bits of A/D converter is 7) and the clock frequency for sampling the reproduction signal and the phase are controlled. Under the control, histogram is separated to generally have five distributions. This is because when PRML has the PR coefficient such as a PR (a, b, b, a) ML, the number of signal levels (signal distributions) becomes five (let a, b denote positive coefficients). Waveform equalizer 86 controls the clock phase and facilitates PR equalization.

FIG. 21A shows a histogram of reproduction signal, which is not asymmetrical, while FIG. 21B shows a histogram of asymmetrical reproduction signal. FIG. 21C shows the histogram of output signal when waveform equalizer 86 PR-equalizes (in this case, PR (3, 4, 4, 3) equalizes) the non-asymmetrical reproduction signal (FIG. 21A). As clear from FIG. 21C, variance is minimum and each level is accurately separated.

On the other hand, FIG. 21D shows a histogram of an equalizer output when the asymmetric reproduction waveform is PR-equalized. As clear from the figure, PR-equalizing asymmetric reproduction waveform increases the variance. This is because PRML is originally intended for processing symmetric waveform and automatically equalizes the waveform in such a manner that each level has equal interval. In other words, when an asymmetric signal which has minimum variance with unequal intervals is supplied, the equalizer forcibly equalizes the signal to have equal intervals. As a result, the variance further increases.

FIG. 22 is a graph that shows the frequency characteristics of reproduction signal based on the histogram of asymmetric reproduction waveform of FIG. 21B. In addition, FIG. 22 also shows the frequency characteristics of the desired PR characteristics. In FIG. 21B, the left side from the center of the reproduction signal level is designated as mark and the right side as space. In the graph of FIG. 22, when the standardized frequency is taken as abscissa and the gain as ordinate, characteristics on the mark side and the characteristics on the space side differ each other due to the influence of asymmetry. As easily understood, in order to equalize the reproduction waveform to have desired PR characteristics, the equalizer must carry out equalization with characteristics that differ on the mark side and on the space side. However, the conventional waveform equalizer 6 cannot equalize the reproduction waveform to have desired PR characteristics highly accurately because the same equalization is carried out on the mark side and the space side. As a result, variance in the output signal of the maximum likelihood decoder 6 (FIG. 16) increases, resulting in degraded performance.

(2) When the adaptive equalization processing is automatically carried out, the results of the temporary judgment (temporary judgment value) utilized in LMS may cause errors. To specifically explain, first of all, in the system shown in FIGS. 19 and 20, when the reproduction signal contains comparatively less noise and provides good signal quality to a certain extent, satisfactory convergence characteristics can be obtained. However, when noises arising from various stresses as described above mix in the reproduction signal and the jitter increases, the bit error rate BER degrades and the probability for making an erroneous temporary judgment increases. Making an erroneous temporary judgment causes the equalization error signal to become abnormal and the LMS action itself becomes abnormal. Consequently, appropriate adaptive equalizing coefficients are unable to be calculated and correct PR equalization is prevented. This degrades the bit error rate of binary data after Viterbi decoding.

SUMMARY OF THE INVENTION

It is an object of the present invention to obtain the correct equalization error even in the asymmetry reproduction waveform or under noisy environment and at the same time to accurately output the temporary judgment value when the coefficients of FIR filter is adaptively controlled. Thus, highly accurate desired PR characteristics can be obtained.

The waveform equalizer according to the present invention equalizes a waveform of a reproduction signal obtained by reproducing marks and non-marks recorded on a recording medium, including: a delay element for delaying propagation of the reproduction signal; a plurality of multipliers for multiplying predetermined coefficients by the reproduction signal and the delayed signal from the delay element; a detector for detecting asymmetry of the reproduction signal arising from physical profiles of each of the marks and the non-marks and for outputting a detection signal representing asymmetric amount; a discriminator for discriminating the marks and the non-marks based on the reproduction signal to output a discriminated signal; a selector for calculating a first coefficient multiplied by the reproduction signal of the marks based on the detection signal outputted from the detector, said selector further calculating a second coefficient multiplied by the reproduction signal of the non-marks, which is different from the first coefficient, and said selector selecting one of the first coefficient and the second coefficient based on the discriminating signal outputted from the discriminator; and an adder for adding outputs from the plurality of multipliers. According to the configuration, the above-mentioned object can be achieved.

The waveform equalizer according to the present invention equalizes a waveform of a reproduction signal obtained by reproducing marks and non-marks recorded on a recording medium, including: a delay element for delaying propagation of the reproduction signal; a plurality of multipliers for multiplying predetermined coefficients by the reproduction signal and the delayed signal from the delay element; a coefficient learning circuit for adaptively updating the predetermined coefficients for each of the plurality of multipliers; and an adder for adding outputs from the plurality of multipliers, said coefficient learning circuit including: a teaching signal generator for generating a teaching signal that serves as an equalizing target; an error detector for detecting an error between an output signal having impulse response of (a, b, b, a) characteristics by partial response method and the teaching signal generated by the teaching signal generator; a discriminator for discriminating the marks and the non-marks based on the reproduction signal to output a discriminating signal; a plurality of registers for updating and outputting the predetermined coefficients so that mean square of the error becomes minimum, said plurality of registers including a first register for holding a first coefficient multiplied by the reproduction signal of the marks and including a second register for holding a second coefficient multiplied by the reproduction signal of the non-marks, which is different from the first coefficient; and a register selector for selecting one of the first coefficient held in the first register and the second coefficient held in the second register based on the discriminating signal outputted from the discriminator. According to the configuration, the above-mentioned object can be achieved.

A PRML detector according to the present invention includes a waveform equalizer for equalizing a waveform of a reproduction signal obtained by reproducing marks and non-marks recorded on a recording medium, and a decoder for generating binary-coded data of the reproduction signal based on the waveform equalized by the waveform equalizer, said decoder outputting a temporary data string which is obtained before the binary-coded data is obtained, said waveform equalizer comprising: an equalizer that includes a delay element for delaying propagation of the reproduction signal, a plurality of multipliers for multiplying predetermined coefficients by the reproduction signal and the delayed signal from the delay element, and an adder for adding outputs from the plurality of multipliers; a target value judging section for determining a target value for equalizing based on the temporary data string outputted from the decoder; and a coefficient adaptive controller for calculating the predetermined coefficients and for adaptively updating the calculated predetermined coefficients for each of a plurality of multipliers. According to the configuration, the above-mentioned object can be achieved.

According to the present invention, changing over the equalization characteristics in the waveform equalizer from the mark side to the space side in accordance with the asymmetry amount can suppress displacement and variance at the detection point and can improve the performance of the PRML. Furthermore, by disposing the coefficient learning circuit, even when asymmetry exists, appropriate equalizing coefficients are learned and the target value can be determined. The use of the waveform equalizer according to the present invention can suppress errors at the time of data decoding to a low level in the PRML signal processing of optical discs such as DVD, MO, etc. and magnetic disks of HDD, etc.

In addition, according to the present invention, the temporary judgment information for judging the PR equalization target is extracted from the Viterbi decoder. Thus, the temporary judgment error rate can be reduced. As a result, by judging the target value based on the state transition rule of the PR from the temporary judgment information, an accurate equalization error can be found and the satisfactory convergence characteristics can be obtained. That is, errors at the time of data decoding can be suppressed to a low level. Furthermore, in the present invention, detecting whether the output is merged or not in the path memory of the Viterbi decoder can prevent loop performance degradation of the feed back system and can avoid an increase of delay.

BRIEF DESCRIPTION OF THE DRAWINGS

Preferred embodiments according to the present invention will be described with reference to the accompanying drawings, in which:

FIG. 8A is a waveform diagram that shows three kinds of impulse responses;

FIG. 8B is a graph of amplitude-frequency characteristics of the three kinds of impulse responses, respectively;

DETAILED DESCRIPTION OF THE PREFERRED EMBODIMENT

In embodiment 1, there described is a waveform equalizer that can greatly improve error rate after PRML processing even for asymmetric waveform of reproduction signal arising from asymmetry between pits and non-pits (for example, spaces between pits) equipped in an optical disc. In embodiment 2, there described is a PRML detector that can accurately find a temporary judgment value necessary for adaptively controlling equalizing coefficients (taps) of the FIR filter even under noisy environment and that can accurately obtain equalization error signal indicating the difference between the temporary judgment value and the digital reproduction signal value after equalization. Note that the present application claims priority right pursuant to Japanese Patent Application Nos. 2000-331973 and 2001-196034. The contents of the specifications and drawings of these applications are incorporated herein by references.

(First Embodiment)

Figure 1:
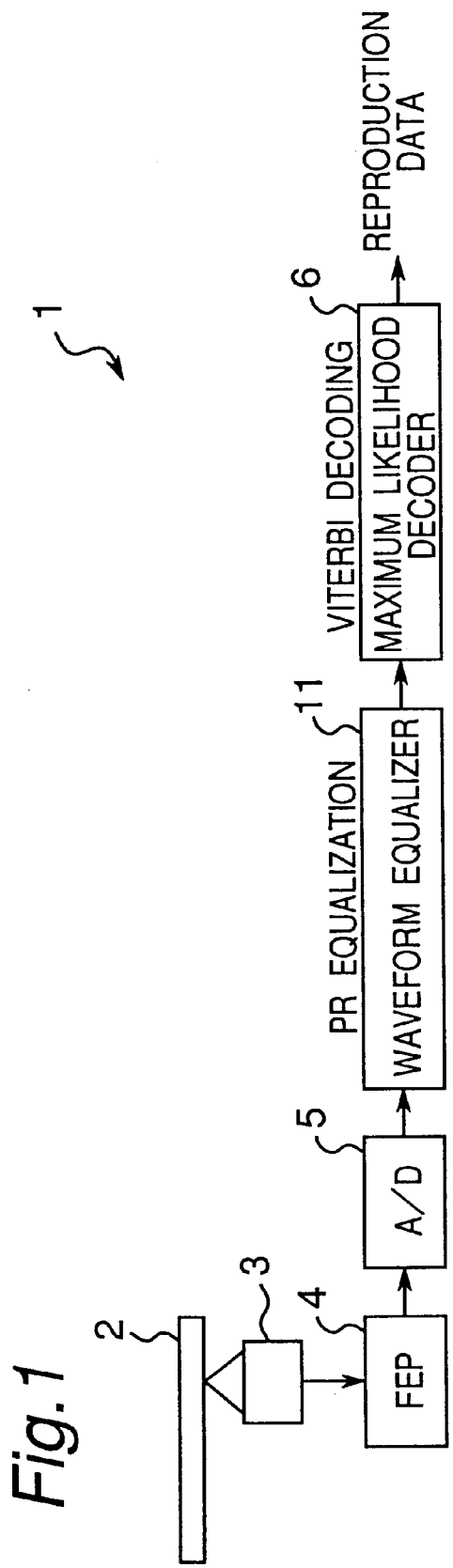
FIG. 1 is a block diagram of a general configuration of the information reproducing apparatus for carrying out PRML signal processing.

FIG. 1 is a block diagram of a general configuration of an information reproducing apparatus 1 that carries out PRML (Partial Response Maximum Likelihood) signal processing. The PRML signal processing is a technique combining the wavelength equalizing technique for modifying reproduction destortion generated when information is reproduced with a signal processing technique for selecting the mostly likely data string from the reproduction signal containing data errors by positively utilizing the redundancy which the equalized waveform itself possesses. For probability estimation of judging "most likely," Viterbi decoding is used. In the following description, an example in which PRML signal processing is carried out on a reproduction signal from optical discs such as DVD (Digital Versatile Disc). will be discussed, but this technique can be utilized for the reproduction signal from magnetic disks such as HDD (hard disk drive).

Information reproducing apparatus 1 comprises an optical pickup 3, front end processor (FEP) 4, analog/digital (A/D) converter 5, waveform equalizer 11, and maximum likelihood decoder 6. Optical pickup 3 irradiates optical disc 2 having the information recorded with laser beam, detects the intensity of the light reflected from optical disc 2, and outputs electrical reproduction signal. FEP 4 amplifies the reproduction signal and adjusts its gain. FEP 4 further carries out noise elimination of the unwanted high frequency band and emphasizing of the required signal band. The output signal from FEP 4 is converted to digital signal by AND converter 5 and entered in waveform equalizer 11. Waveform equalizer 11 equalizes waveform of the digital signal to the preset PR characteristics. Maximum likelihood decoder 6 decodes the signal waveform-equalized to PR characteristics and outputs as the reproduction data. In the present specification, maximum likelihood decoder 6 is also called as a Viterbi decoder. When waveform equalizer 11 carries out PR equalization, waveform equalizer 11 and the maximum likelihood decoder 6 are also called a PRML detector in combination.

Figure 18:
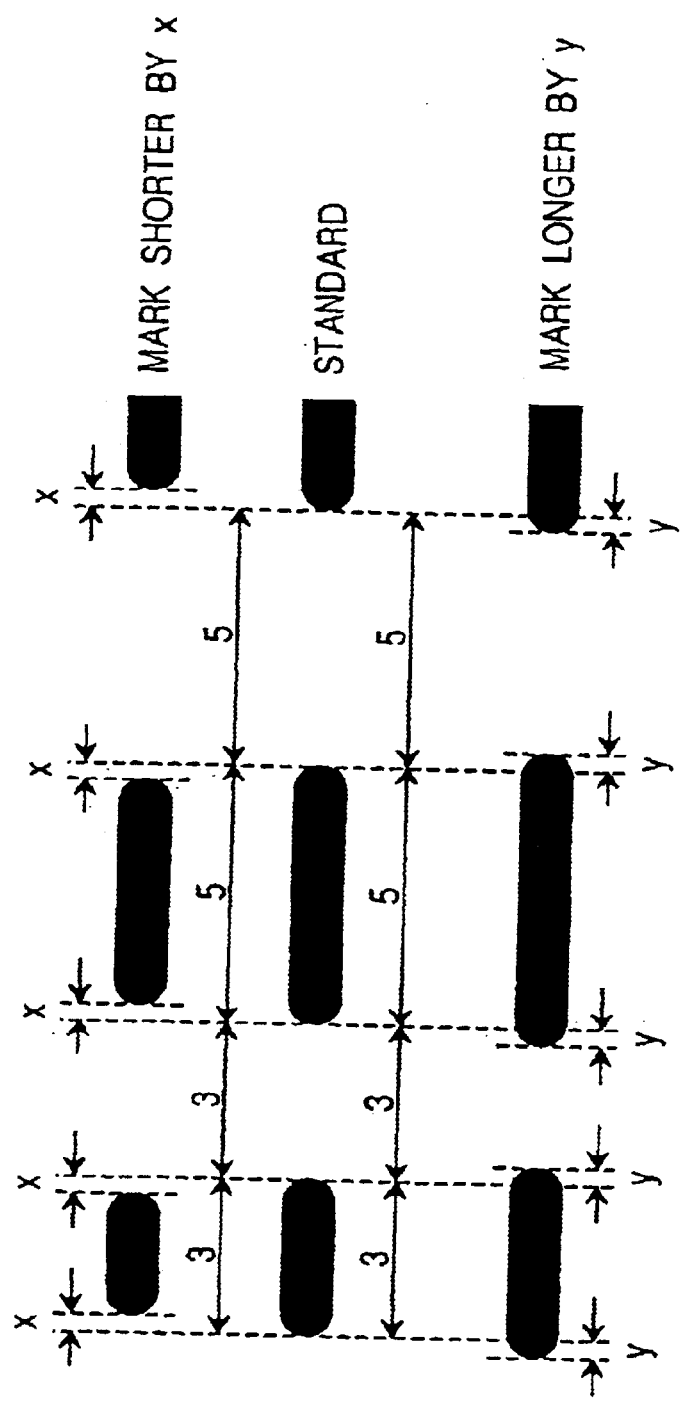
FIG. 18A is a diagram of the asymmetric model with the mark width uniformly shortened by length X.
FIG. 18B is a diagram of the asymmetric model.
FIG. 18C is a diagram of the asymmetric model with the mark width uniformly shortened by length y.

In optical disc 2, information is recorded as pits or marks. Assume that the pits is formed, so-called, asymmetrically. That is, the space between one pit and the other must not be formed accurately in lengths of 3T, 5T when width of a detection window is designated as the reference length T. For specific examples of asymmetry, see FIG. 18A or FIG. 18C.

Figure 2:
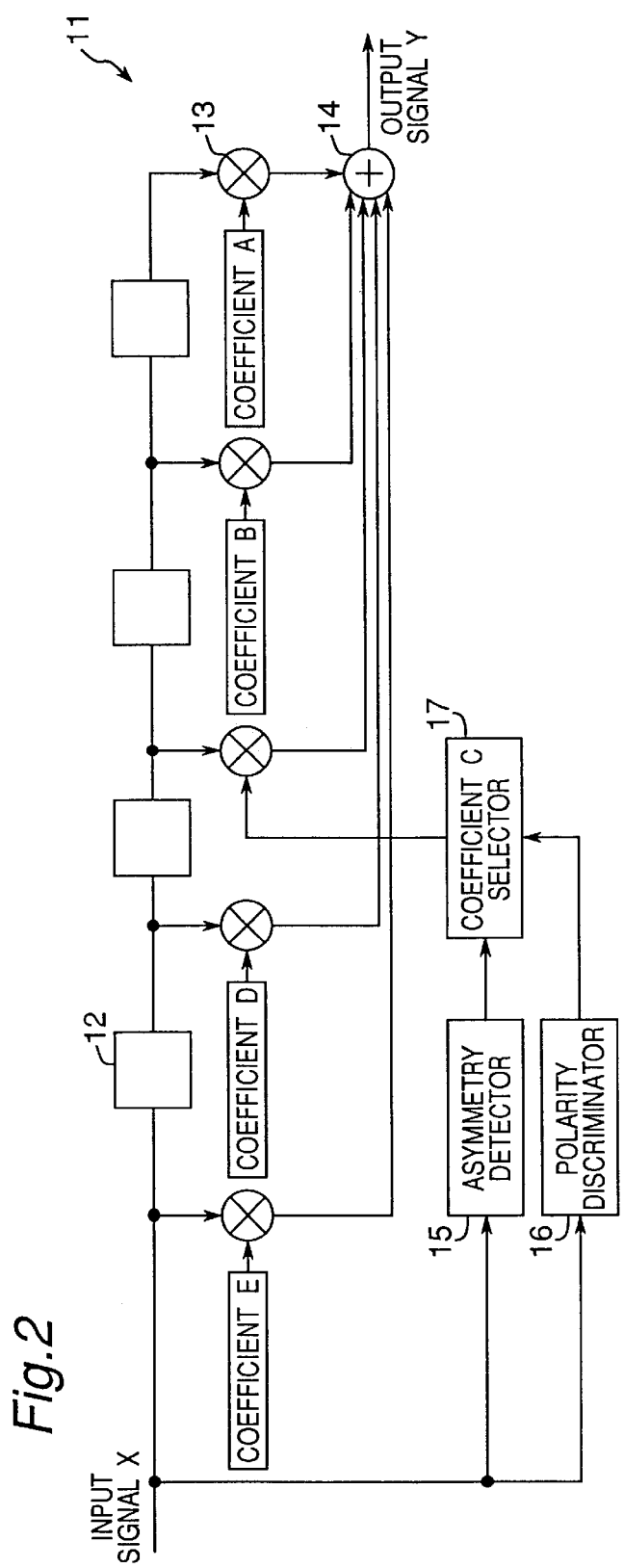
FIG. 2 is a block diagram of an exemplary configuration of waveform equalizer.

FIG. 2 is a block diagram of an exemplary configuration of waveform equalizer 11. Waveform equalizer 11 comprises a plurality of delay elements 12 connected in series, equalizing coefficients (coefficient A–E) for achieving the desired characteristics, a plurality of multipliers 13 for multiplying each of output signals of delay elements 12 by each of equalizing coefficients, and an adder 14 for adding each of multiplier output signals. The delay amount of delay element 12 is a parameter for determining cutoff frequency to input signal X from A/D converter 5 (FIG. 1) and should be appropriately adjusted. Numbers of delay elements 12 corresponds to those of equalizing coefficients (taps) for achieving desired equalization and may be determined appropriately. In the example shown in FIG. 2, a filter with 5 taps is used, and four delay elements are therefore inserted. The number of taps can be varied in such a manner to satisfy the required performance.

Waveform equalizer 11 further comprises an asymmetry detector 15, polarity discriminator 16, and coefficient C selector 17. Asymmetry detector 15 calculates asymmetry amount from input signal X. Amount of asymmetry is expressed as a ratio of overall amplitude A of input signal X to displacement amount B from a center of the signal waveform, that is, B/A. For example, let 1 be the overall amplitude A and 0.241 be displacement amount B from the center. The asymmetry amount is 24.1%. Polarity discriminator 16 discriminates polarity of input signal X. "Discriminating polarity of input signal X" means to discriminate a mark side and a space side pursuant to input signal X. For example, the polarity may be discriminated by "0" or "1" of a most significant bit (MSB) of input signal X. Coefficient C selector 17 calculates coefficient C for the mark side and C' for the space side based on the asymmetry amount detected in asymmetry detector 15 and the difference between the waveform and desired values of input signal X. Coefficient C selector 17 changes over output coefficient C and coefficient C' by the signal from polarity discriminator 16. Note that difference between the waveform of input signal X and the desired value corresponds to the equalization error in LMS (Least-mean square) algorithm later discussed. The procedure for generating coefficients based on the equalization error will be later discussed.

Figure 3:
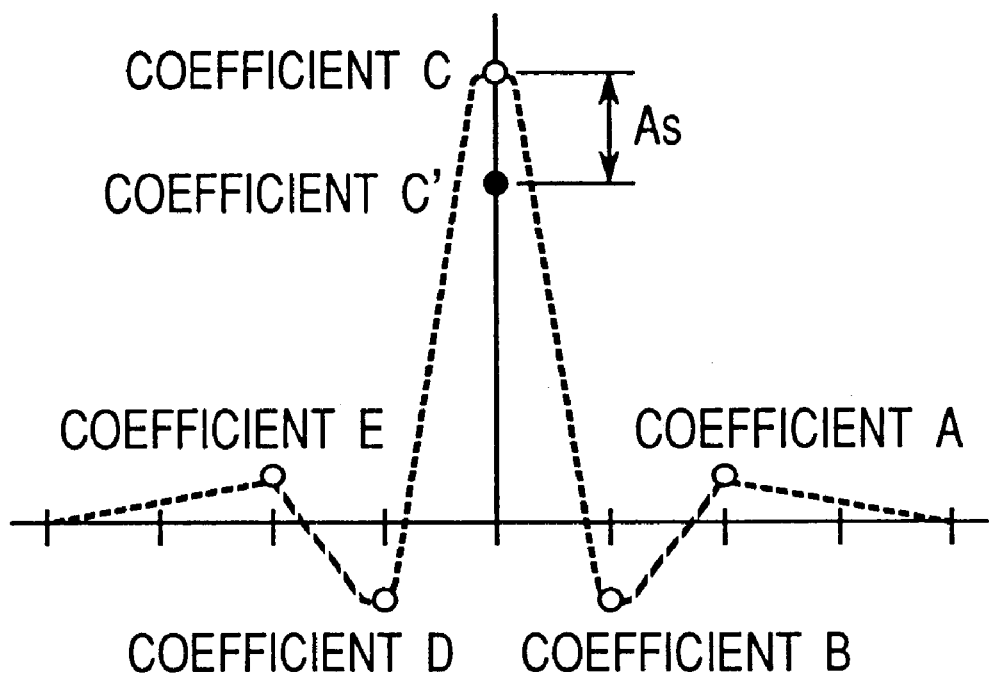
FIG. 3 is a graph of an exemplary impulse response.

Waveform equalizer 11 according to the present invention has an absolute value of the center coefficient (center tap) greater than absolute values of other coefficients and has impulse response that has nearly symmetrical values on the right and left with the center tap set as the center. FIG. 3 shows a graph of an exemplary impulse response. Coefficients A through E are shown with open circles. Intervals between coefficients (tap intervals) in the abscissa corresponds to delay amount of delay element 12 (FIG. 2). The ordinate shows tap values. In particular, a center tap value adjusts the output signal gain of waveform equalizer 11 (FIG. 2) and each tap ratio determines the boost amount of waveform equalizer 11 (FIG. 2).

Figure 9A:
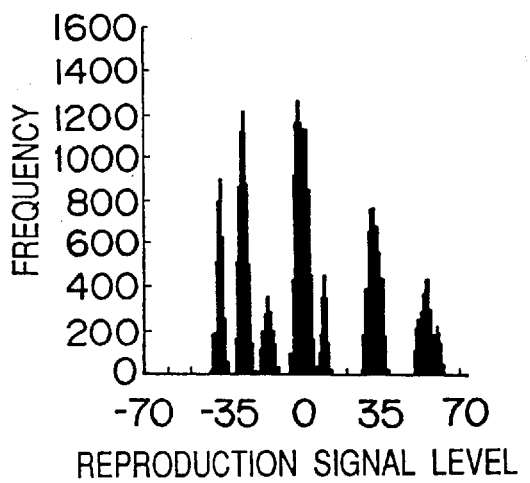
FIG. 9A is a histogram of a asymmetrical reproduction waveform being sampled by an A/D converter when (1, 7) RLL modulation code is used.

Waveform equalizer 11 (FIG. 2) changes over values of the center tap to coefficient C and coefficient C', respectively at a mark side of the optical disc and at a space side, for example, on a negative side and a positive side with level "0" of the reproduction signal set as the center in FIG. 9A. More specifically, waveform equalizer 11 (FIG. 2) varies the gain and boost amount of reproduction signal and equalizes on the mark side and on the space side, respectively. The difference As between coefficient C value and coefficient C' value is calculated from the asymmetric amount detected by asymmetry detector 15 (FIG. 2). Needless to say, when waveform equalizer 11 (FIG. 2) receives non-asymmetric input waveform X, asymmetry detector 15 judges it as "not asymmetric" and coefficient C and coefficient C' become the same value. Consequently the difference As is 0.

Figure 4:
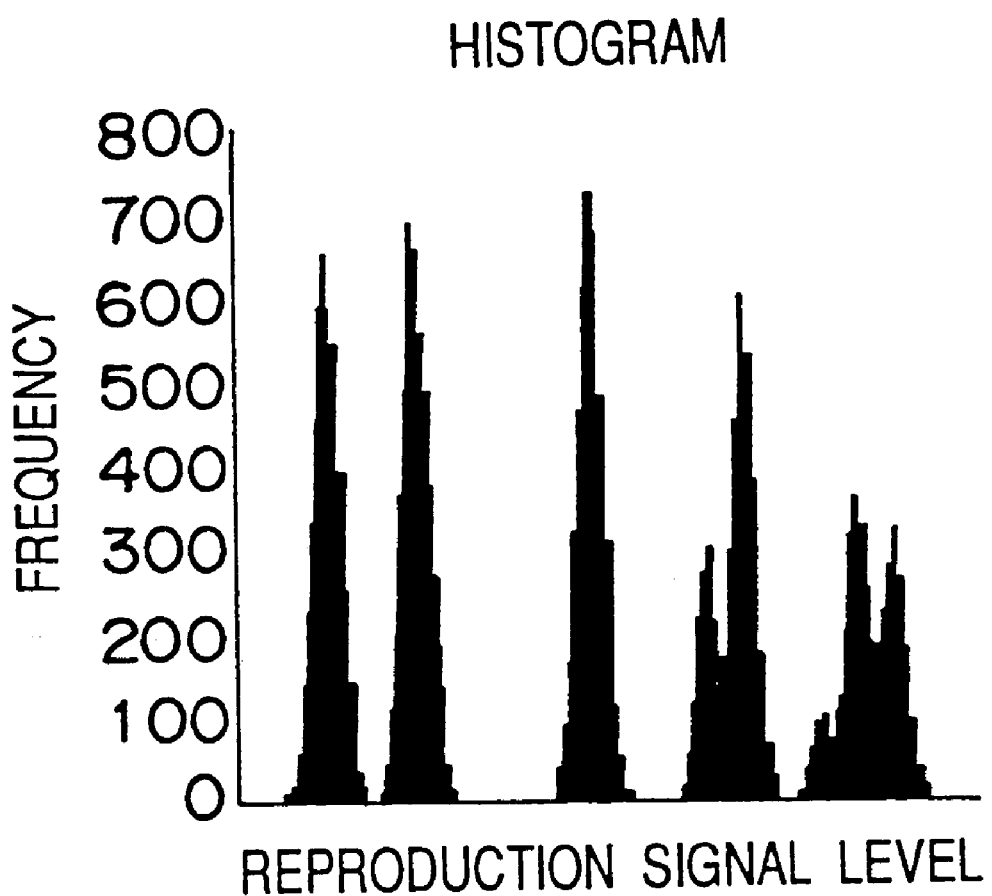
FIG. 4 is a histogram of reproduction signal when waveform of asymmetrical signal is equalized.
Figure 16:
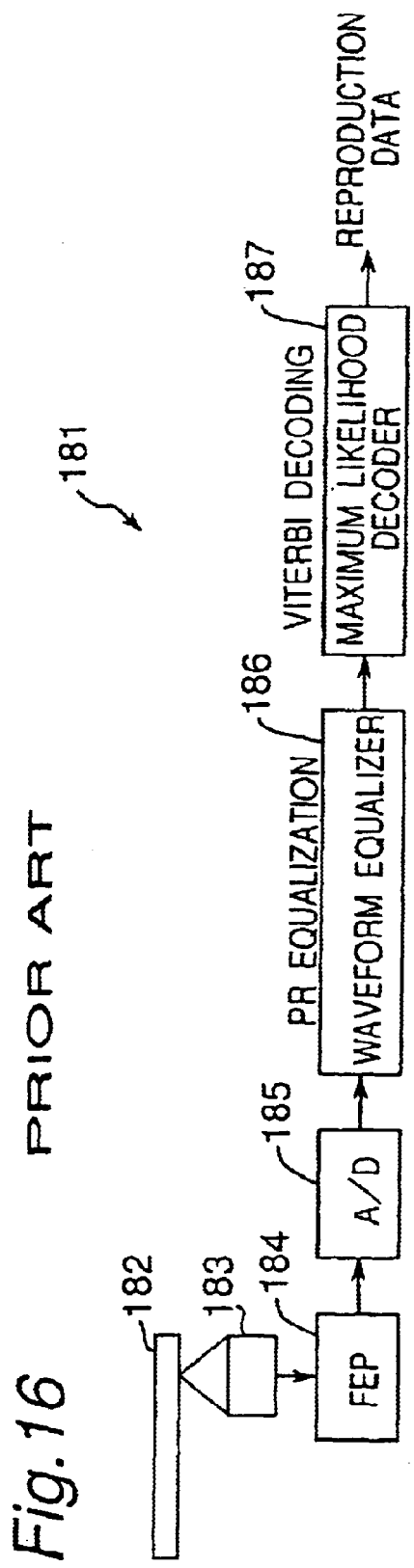
FIG. 16 is a block diagram of a general configuration of an information reproducing apparatus using PRML.
Figure 17:
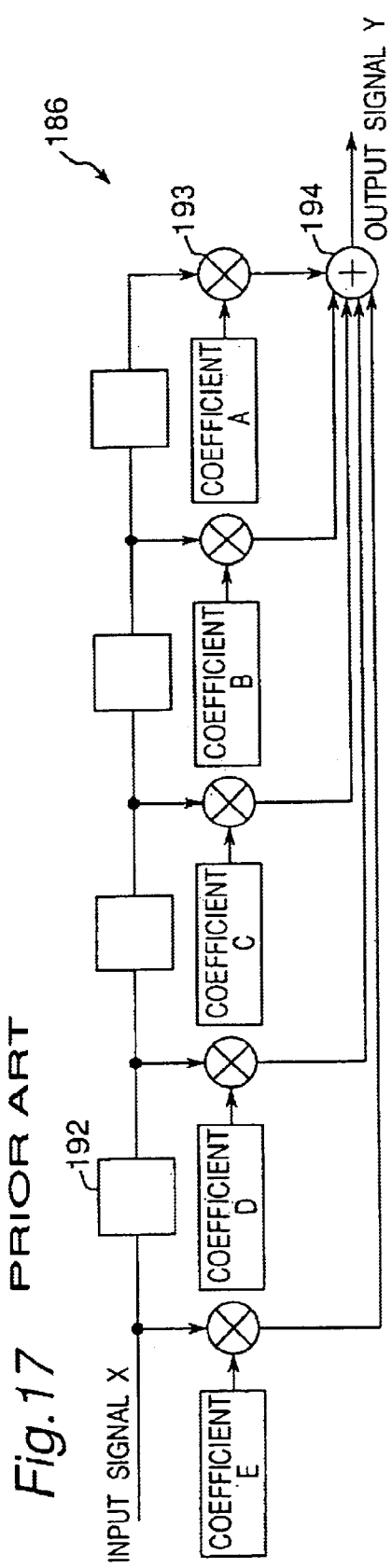
FIG. 17 is a block diagram of an example of the configuration of the waveform equalizer.

FIG. 4 shows a histogram of a reproduction signal when the waveform of the asymmetric signal (FIG. 21B) is equalized. As compared to the histogram (FIG. 21D) of reproduction signal of the conventional waveform equalizer 186 (FIG. 16), it is understood that a variance becomes smaller. In this way, by adaptively changing over the center tap value on each of mark side and space side and equalizing waveform with varied equalization characteristics, equalized waveforms that have small variance values at detection points can be output even in accordance with the asymmetric reproduction signal.

It is extremely important to determine the change amount of center tap of the waveform equalizer in accordance with asymmetry amount obtained from input signal X. In the present embodiment, further discussion will be made on an adaptive waveform equalizer that automatically detects the asymmetry amount and determines appropriate equalizing coefficients for the mark side and the space side by using LMS (Least-mean square) algorithm.

Figure 5:
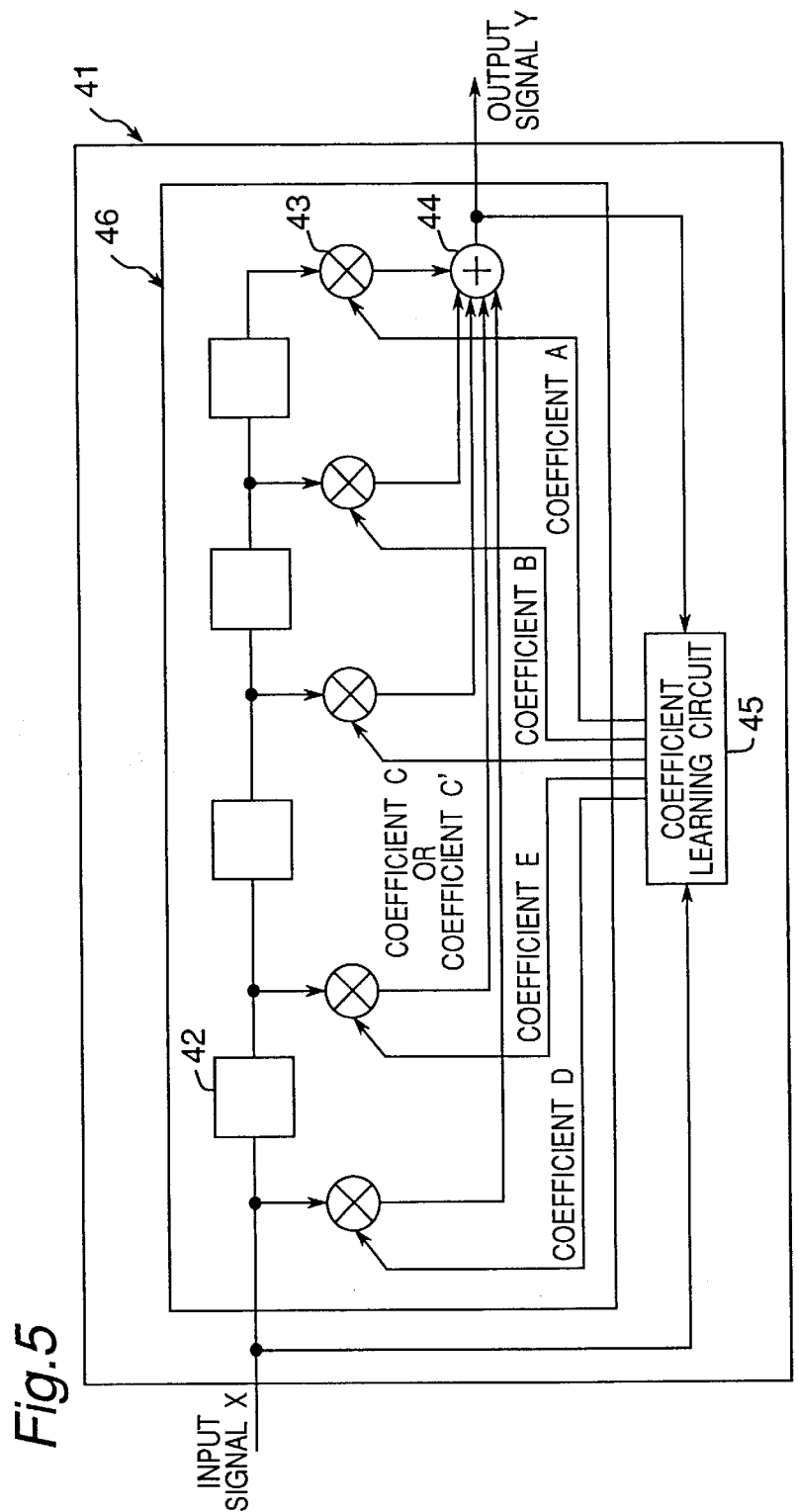
FIG. 5 is a block diagram of the configuration of adaptive waveform equalizer that determines and updates appropriate equalizing coefficients.

FIG. 5 shows a configuration of adaptive waveform equalizer 41 for determining and updating the appropriate equalizing coefficients. Adaptive waveform equalizer 41 comprises a plurality of delay elements 42 connected in series, a coefficient learning circuit 45 for determining equalizing coefficients (coefficients A through E) that achieve the desired PR characteristics, a plurality of multipliers 43 for multiplying the output signal of each delay element 42 by the equalizing coefficients, and an adder 44 for adding each output signal of the multipliers. Because functions and actions of ay elements 42, coefficients A through E, multipliers 43, and adder 44 are same as those of delay elements 12, coefficients A through E, multipliers 13, and adder 14 explained in waveform equalizer 11 (FIG. 2), the explanation will be omitted.

Figure 6:
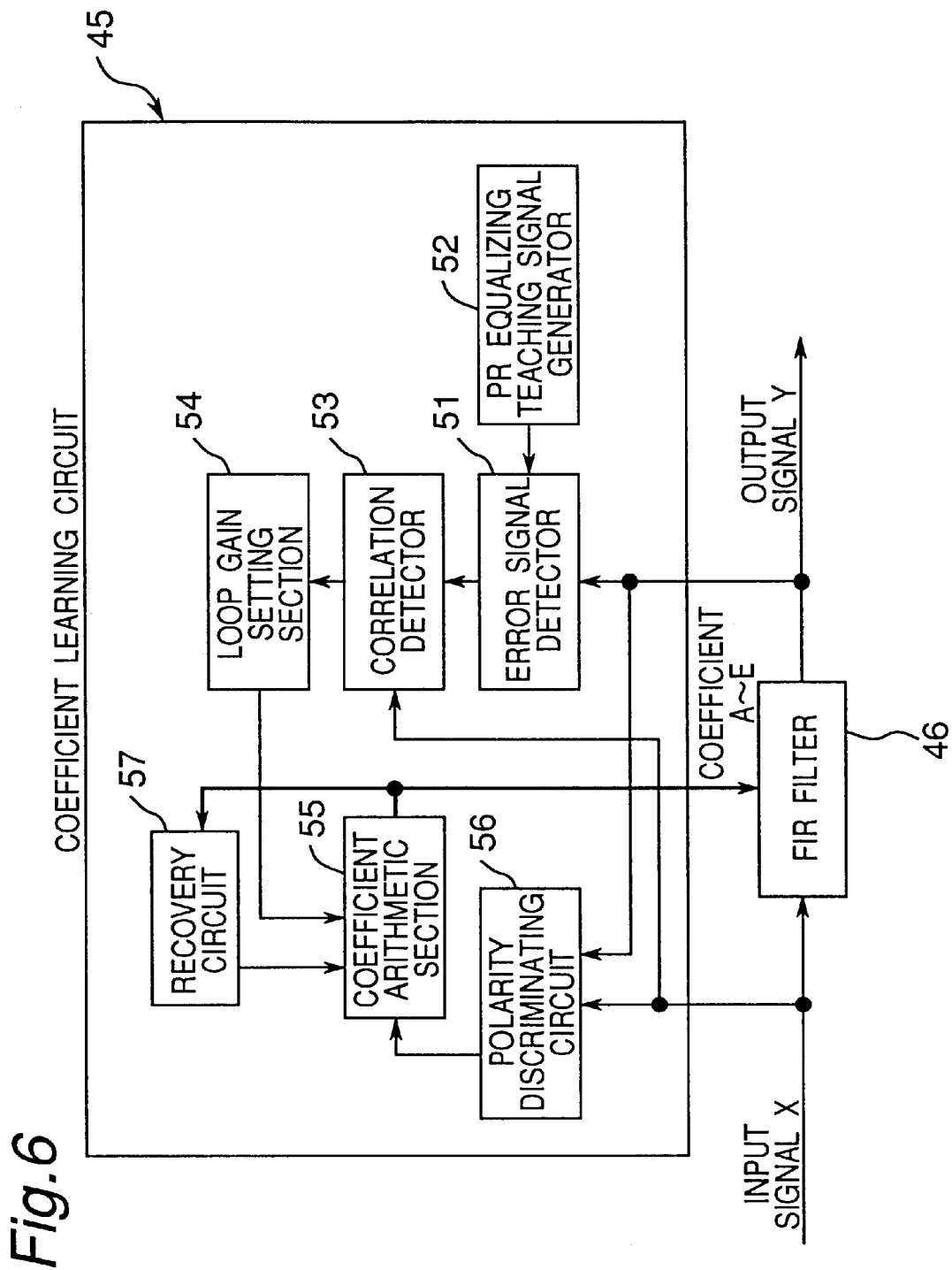
FIG. 6 is a block diagram of the configuration of coefficient learning circuit.

FIG. 6 is a block diagram of the configuration of coefficient learning circuit 45. Coefficient learning circuit 45 comprises an error signal detector 51, PR equalizing teaching signal generator 52, correlation detector 53, loop gain setting section 54, coefficient arithmetic section 55, polarity discriminator 56, and recovery circuit 57. Each component element of coefficient learning circuit 45 is provided based on the setting formula (Eq. (1)) of the equalizing coefficient of LMS described above. That is, to show it again, $$w(n(T+1)) = w(nT) + A \cdot e(nT) \cdot x(nT) \qquad \text{Eq. (1)}$$

(where, T=0, 1, 2, 3, . . . )

w(nT) is a present coefficient, w(n(T+1)) is a coefficient to be updated, "A" is a tap gain, e(nT) is an equalization error, x(nT) is an FIR filter input signal. n is a parameter for selecting update cycles of the coefficient.

Error signal detector 51 detects an error between output signal Y of FIR filter 46 and a signal from PR equalizing teaching signal generator 52 that outputs the teaching signal for PR equalization. The teaching signal is targeted for PR equalization. The error signal corresponds to equalization error e(nT) of Eq. (1) above. Correlation detector 53 detects correlation between error signal e(nT) and input signal X. The correlation is expressed by a product of two signals. Consequently, the correlation detecting signal corresponds to e(nT)·x (nT) of Eq. (1). Loop gain setting section 54 adjust the response speed of LMS feedback control. In Eq. (1), this corresponds to the tap gain A. Coefficient arithmetic section 55 adds an updated value (i.e. A·e(nT)·x(nT)) calculated in the preceding block to the present coefficient and calculated the updated equalizing coefficient.

Figure 7:
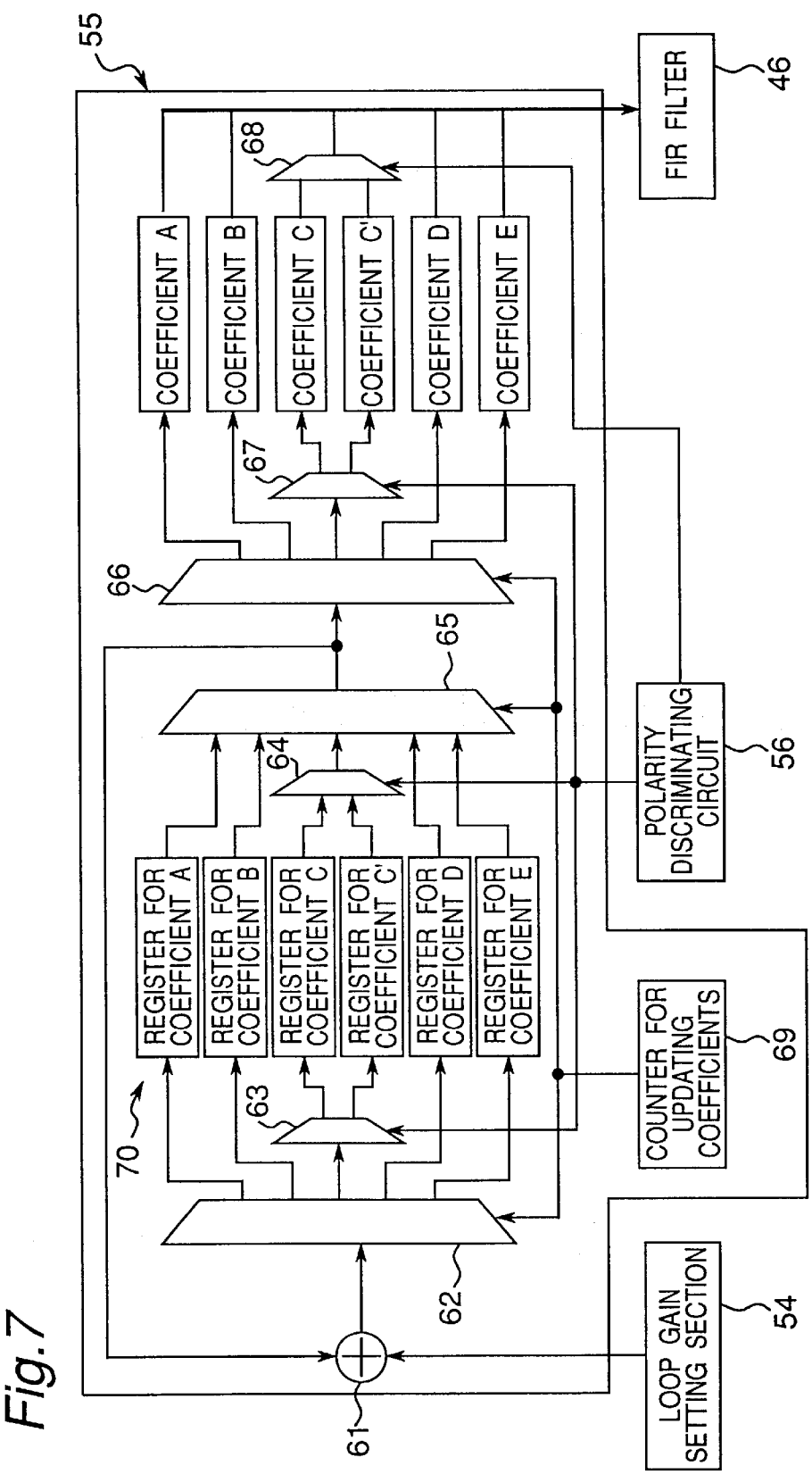
FIG. 7 is a block diagram of the configuration of coefficient arithmetic section.

FIG. 7 is a block diagram of the configuration of coefficient arithmetic section 55. Coefficient arithmetic section 55 comprises an adder 61, selectors 62 through 68, coefficient updating counter 69, and a group of registers 70 for holding values of coefficients A through C, C', D, and E, respectively. First of all, coefficient updating counter 69 controls selectors 62, 65, 66 to add the value outputted from loop gain setting section 54 and the values held in registers 70, and updates each of coefficient registers 70, successively. Since the bit number of this counter can be decided in advance in the design specifications, changes of the coefficient updating speed can be controlled.

Now, features of the invention related to the present embodiment will be described. Polarity discriminating circuit 56 discriminates the polarity based on whether the value outputted from loop gain setting section 54 is the calculated value on the mark side of the optical disc or the calculated value on the space side. Selectors 63, 64, 67 changes over registers to be updated on the mark side and on the space side based on the discrimination results of polarity discriminating circuit 56. Polarity discriminating circuit 56 can discriminate the polarity from both of input signal X and output signal Y shown in FIG. 6. The section behind selector 66 has functions of outputting the calculated values held in the register to FIR filter 46 as the tap coefficients. To be more specific, they are functions to hold values of bit-width (i.e. coefficient values) adjusted and functions to hold initial values used in the beginning of learning. Polarity discriminating circuit 56 discriminates and outputs the mark side and the space side based on the input signal X. Selector 68 outputs coefficient C when the discriminating signal represents the mark side and coefficient C' when it represents the space side.

According to the configuration described above, the center taps (coefficient C, coefficient C') can be learned and updated in each of mark side and the space side for the asymmetric signal and appropriate equalization can be achieved both on the mark side and space side, respectively. In addition, even if great asymmetry exists on the mark side or on the space side, appropriate waveform equalization is possible without taking the asymmetry polarity taken into account.

Next discussion will be made on recovery circuit 57 (FIG. 6). Waveform equalizer 11 (FIG. 1) of the present embodiment has impulse response in that the absolute value of the center tap is greater than the absolute values of other taps and has impulse response that has nearly symmetric values with the center tap set as the center. However, due to various disturbances including defects, learned and converged values of the coefficients represent to an unexpected impulse response.

FIG. 8A is a waveform of three types of impulse responses, which are A-TAP, B-TAP, C-TAP, respectively. On the other hand, FIG. 8B is graphs of relevant amplitude frequency characteristics of three types of impulse responses of 7-tap FIR filter. A-TAP is an impulse response in which the absolute value of the center tap is greater than absolute values of other taps and the impulse response has values closely symmetrical with the center tap set as a center. As against this, at B-TAP and C-TAP, protruded absolute values of two taps are greater than absolute values of other taps and the values of the two taps are nearly the same. As clear from FIG. 8A and FIG. 8B, though the impulse responses (FIG. 8A) differs each other, it is understood that the amplitude frequency (FIG. 8B) indicate nearly same characteristics. Specifically, in 8–16 modulation, which is recording modulation method in the DVD specification, the normalized frequency up to about 0.16 is used. Consequently, at any of A-TAP, B-TAP, C-TAP, the amplitude frequency characteristics are nearly same. Note that in (1,7) RLL (Run Length Limited) modulated code, the normalized frequency up to about 0.25 is used. In this case, at any of A-TAP, B-TAP, C-TAP, nearly the same amplitude frequency characteristics are used. Because waveform equalizer 11 (FIG. 1) is composed on the assumption that impulse responses of the characteristics such as A-TAP are adopted, inconvenience occurs in the impulse response of the characteristics such as B-TAP, C-TAP. Consequently, recovery circuit 57 (FIG. 6) judges that the equalizer falls into the impulse response such as B-TAP, C-TAP when the tap value corresponding to the characteristics of the tap of B-TAP, C-TAP as described above is obtained, and sets the learning results to the initial value and starts re-learning.

In the description as described, waveform equalizer 11 (FIG. 1) has an odd number of tap coefficients and varies the equalizing characteristics using the tap coefficient at the center only which has tap values different on the mark side and on the space side. However, the present invention is not restricted to this kind of configuration. For example, the wavelength equalizer may have an even number of tap coefficients. In addition, for tap coefficients used on the mark side and on the space side, a value located at the center may not be adopted. In addition, not only one tap coefficient is varied but a plurality of tap coefficients may be varied on the mark side and on the space side.

Figure 21A:
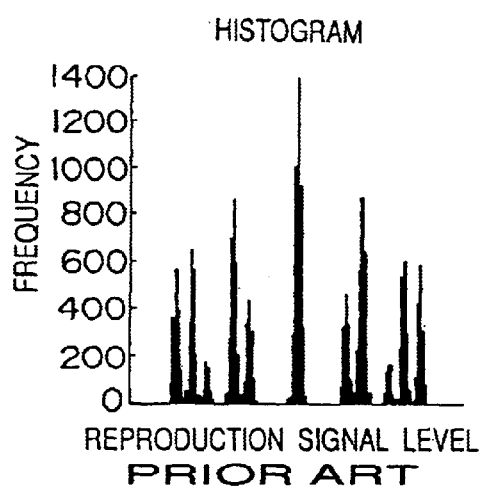
FIG. 21A is a histogram of a reproduction signal which is not asymmetric.
Figure 21B:
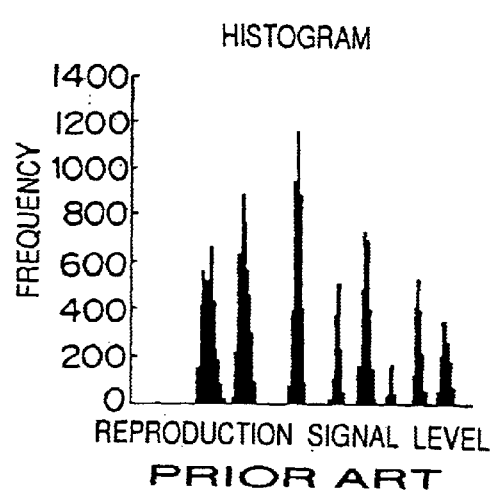
FIG. 21B is a histogram of an asymmetric reproduction signal.
Figure 21C:
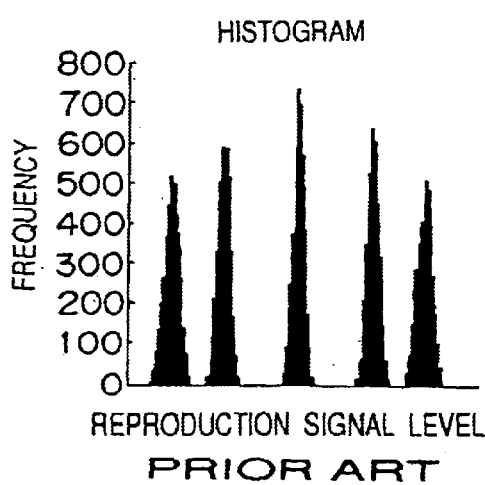
FIG. 21C is a histogram of the output signal when the waveform equalizer PR-equalizes the reproduction signal which is not asymmetric.
Figure 21D:
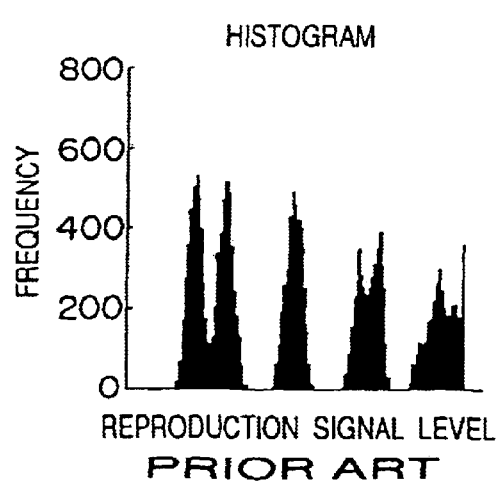
FIG. 21D is a histogram of the equalizer output signal when asymmetric reproduction waveform is PR-equalized.
Figure 22:
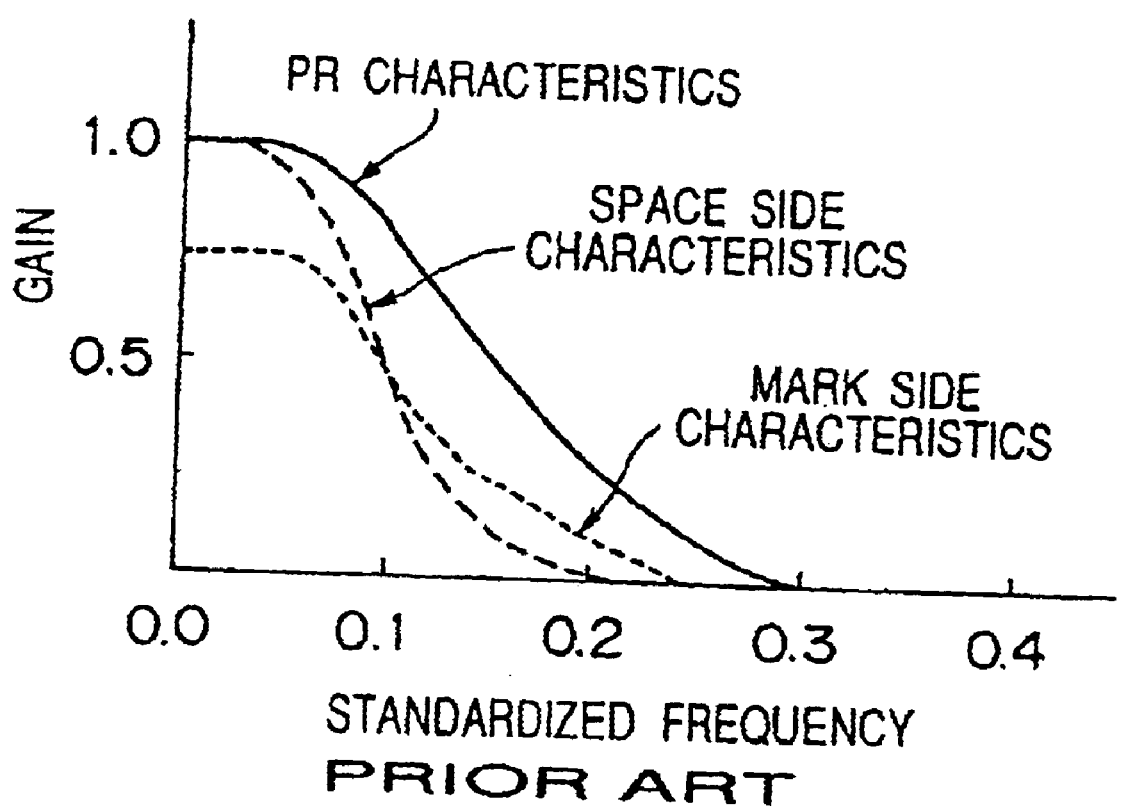
FIG. 22 is a graph of the frequency characteristics of reproduction waveform based on the histogram of asymmetric reproduction waveform of FIG. 21B.

The present invention is described using an example of 8–16 modulation of DVD as the recording modulation method. However, the present invention can be applied to the case in which, for example, (1, 7) RLL (Run Length Limited) modulation code is used. FIG. 9A shows a histogram when a asymmetrical reproduction waveform is sampled by A/D converter 5 (FIG. 1). This histogram shows the reproduction signal when phase errors are detected with the reproduction signal level (0) set as a reference and the clock frequency and phase for sampling the reproduction signal is controlled as is the case of the present embodiment. When the reference for detecting the phase error is varied, histograms shown in FIGS. 21A, 21B, and 9A are not obtained.

Figure 9B:
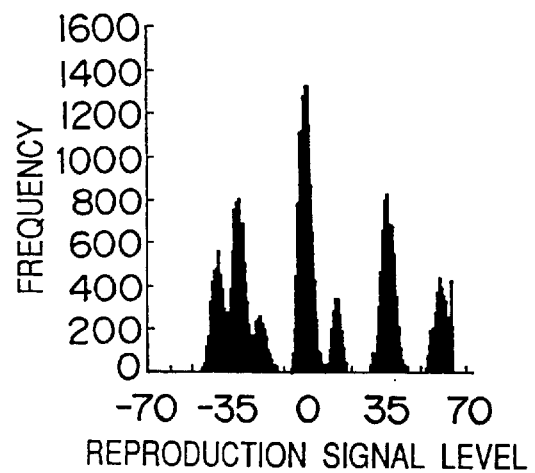
FIG. 9B is a histogram of output signals of a conventional waveform equalizer.

Furthermore, FIG. 9B shows a histogram of the output signal of the conventional waveform equalizer, which does not change the equalizing characteristics on the mark side and on the space side. According to FIG. 9B, when the waveform is equalized to PR (1, 2, 2, 1) characteristics, it is expected that the output of the waveform equalizer is divided into seven signal distributions. However, since asymmetry exists in the reproduction waveform, the output is not successfully distributed into seven signal level bands. Note that "being equalized to PR (1, 2, 2, 1) characteristics" means that when the signals read from the disc are (1, 0, 0, 1), the waveform equalizer outputs 1×1+2×0+2×0+1×1=2. Because when width of the mark that expresses 1 and the space that expresses 0 are set to "2T or more," patterns of (1, 0, 1) and (0, 1, 0) are not included in the entered signal, the outputs can be restricted to 7 kinds. Thus, the output signal from the wavelength equalizer is assumed to be classified into 7 signal distributions.

Figure 9C:
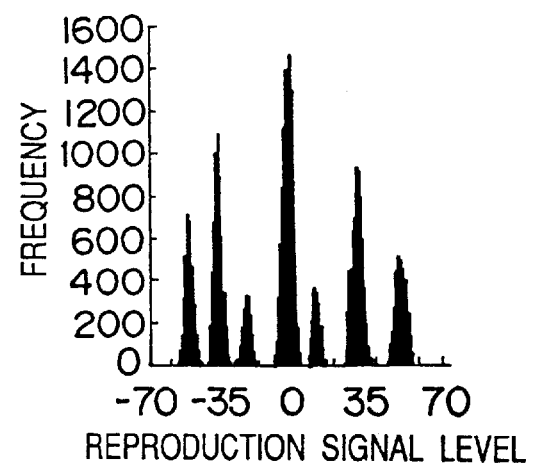
FIG. 9C is a histogram of output signals of a waveform equalizer according to the present invention.

On the other hand, FIG. 9C shows a histogram of output signal of the waveform equalizer according to the present invention. As shown in FIG. 9C, distribution of the output signal from the waveform equalizer according to the present invention is clearly divided into seven signal level bands and has small variance. The waveform equalizer according to the present invention can suppress displacement and variance at the detection point and can improve the performance of PRML, even when (1,7) RLL demodulation code is used.

Not only due to influence of asymmetry shown in FIG. 9A but also due to influence of noise and various stresses, variance of each level of the reproduction signal may be increased. When the variance is small, the sample value comes close to the reproduction signal level 0 shown on the abscissa of FIGS. 9A through C at the time the tap coefficient is changed over by the control signal from polarity discriminating circuit 56 (FIG. 6). Assuming that the reproduction signal level is set to 0, the tap coefficient must be multiplied by 0. As a result, the same value is obtained even before and after the tap coefficient is changed over, which appears to give no detrimental effect. However, due to various causes, there are cases in which the sample value at the time of change-over (reproduction signal level is in the vicinity of 0) has a comparatively large value. In such event, the multiplication results may greatly differ before and after the tap coefficient is changed over, resulting in detrimental effects in the waveform equalization. Consequently, the sample value preferably has the value close to the reproduction signal level 0, at the time the tap coefficient is changed over by the control signal by the polarity discriminating circuit 56 (FIG. 6). In order to avoid detrimental effects, the sample value is set to achieve smaller values, such as reducing to ½, ¼, or ⅛ at the time described above.

(Second Embodiment)

Figure 10:
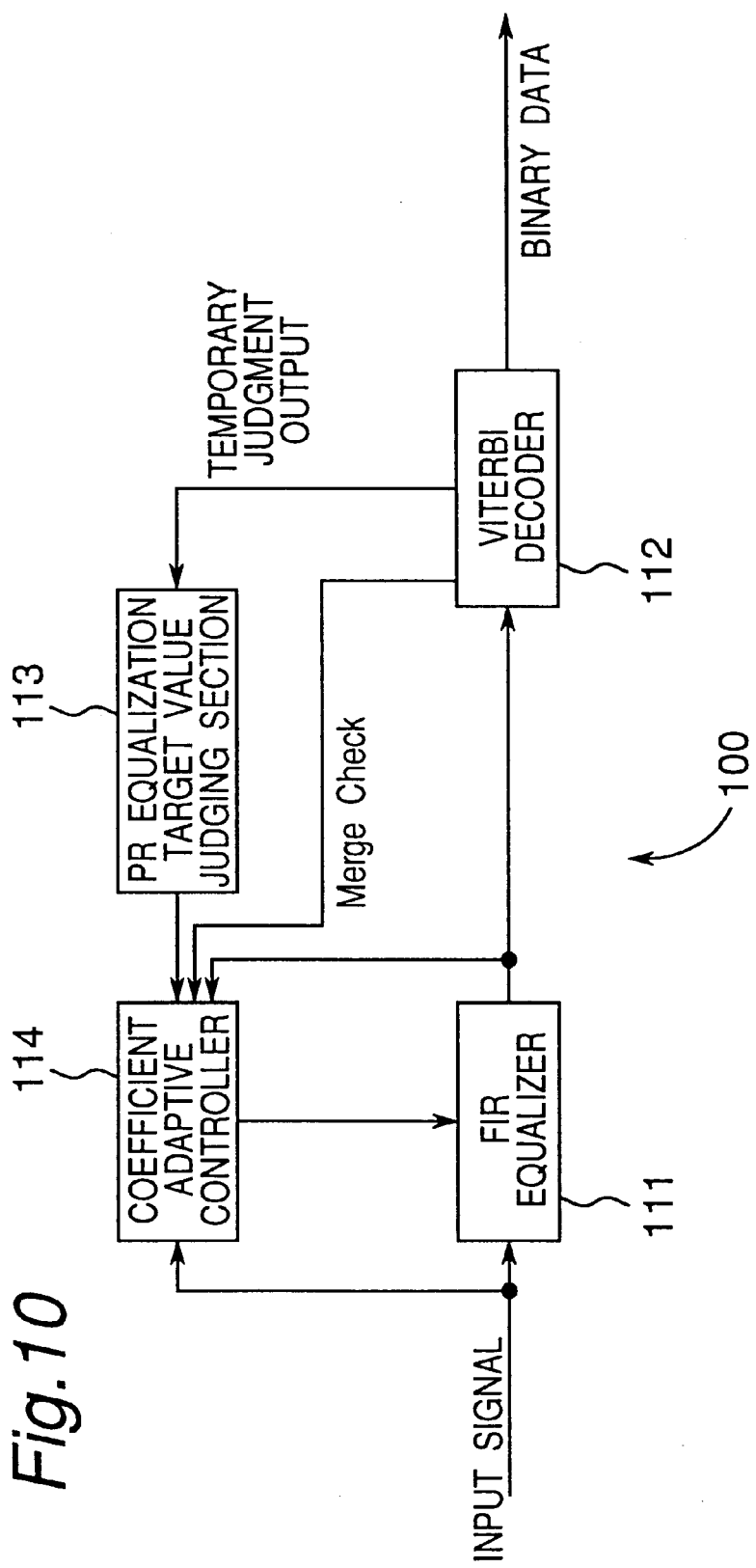
FIG. 10 is a block diagram of the configuration of the PRML detector according to embodiment 2.

FIG. 10 is a block diagram of the configuration of PRML detector 100 according to embodiment 2. The features of PRML detector 100 lies in Viterbi recorder 112 that outputs temporary judgment results. As described in FIG. 19 or FIG. 20, the conventional PR temporary judgment is made based on the signal before it is entered in the Viterbi decoder (i.e. maximum likelihood decoder). For this PR temporary judgment, more accurate binary-coded data string in the Viterbi decoder is used to obtain highly accurate desired PR characteristics.

PRML detector 100 comprises an FIR equalizer 111, Viterbi decoder 112, PR equalization target value judging section 113, and coefficient adaptive controller 114. PRML detector 100 has functions corresponding to the wavelength equalizer 11 of information reproducing apparatus 1 described referring to FIG. 1 and maximum likelihood decoder 6. FIR equalizer 111, PR equalization target value judging section 113, and coefficient adaptive controller 114 are also called the adaptive equalizer and corresponds to waveform equalizer 11 (FIG. 1). More specifically, FIR equalizer 111 of PRML detector 100 corresponds to FIR filter 46 (FIG. 6), PR equalization target value judging section 113 corresponds to error signal detector 51 (FIG. 6), and coefficient adaptive controller 114 corresponds primarily to correlation detector 53, loop gain setting section 54, coefficient arithmetic section 55, and polarity discriminating circuit 56.

To FIR equalizer 111, digital signal after AD conversion is entered. By using FIR equalizer 111, the signal can be equalized to the desired PR characteristics. PR will be described in detail as follows.

The recording and reproducing system of the optical disc has various fluctuations of low-frequency components. When the recording density is increased, the upper limit of the frequency band of the recording and reproducing system is used and relevant reproduction waveforms tend to cause interference when adjacent marks are read. When reproduction waveforms cause interference, reading errors occur. This phenomenon is called as intercede interference. PR equalization positively utilizes the intercode interference. Thus, the significance of the data at the sampling point can be determined in accordance with the transmission characteristics. This means that the reproduction signal from the disc can be equalized in the desired form or characteristics.

In PR equalization, various method exist. Consequently, it is necessary to select the system that is consistent to the frequency characteristics of the recording medium. In the case of optical discs, particularly, in the case of DVD, it is essential to select PR to conform to the modulation transfer function (MTF), which is the frequency characteristics of the optical system and that takes into account the modulation frequency characteristics of recorded code. In reproducing DVD, codeword of minimum code length 3T (such as EFM (Eight to Fourteen Modulation) or EFM-Plus code) is utilized. If reproduction signals of DVD are PR-equalized to adopt PR (a, b, b, a) of 4 PR length, the signal can be restricted to five levels (0, a, a+b, a+2b, 2a+2b). Consequently, the number of states of the Viterbi decoder is 5. In this "a" and "b," integers are entered. In addition, if it is the case in which the codeword of 2T minimum code length such as (1, 7) RLL (Run Length Limited) code is utilized for the optical disc and PR (a, b, b, a) of 4 PR length is further adopted, the signal level has 7 values (0, a, 2a, a+b, 2b, a+2b, 2a+2b) and the number of states of the Viterbi decoder is 7. As the PR length increases, the signal levels increases and the number of states of the Viterbi decoder increases. That is, still more complicated system results.

As described above, when a signal is PR-equalized using the adaptive algorithm, as the probability to make mistakes in temporary judgment increases, it becomes difficult to calculate accurate equalization errors at all the equalization targets and satisfactory convergence characteristics are unable to be obtained. Therefore, as shown in FIG. 10, by extracting a binary-coded data string used for temporary judgment from Viterbi decoder 12, error rate of the temporary judgment can be reduced.

In the following section, a system which combines a codeword of 2T minimum code length with PR (a, b, b, a) is taken as an example, and explanation will be made on the fact in that a more accurate equalizing error is calculated for the desired equalization targets, and satisfactory converging characteristics is obtained.

Figure 11:
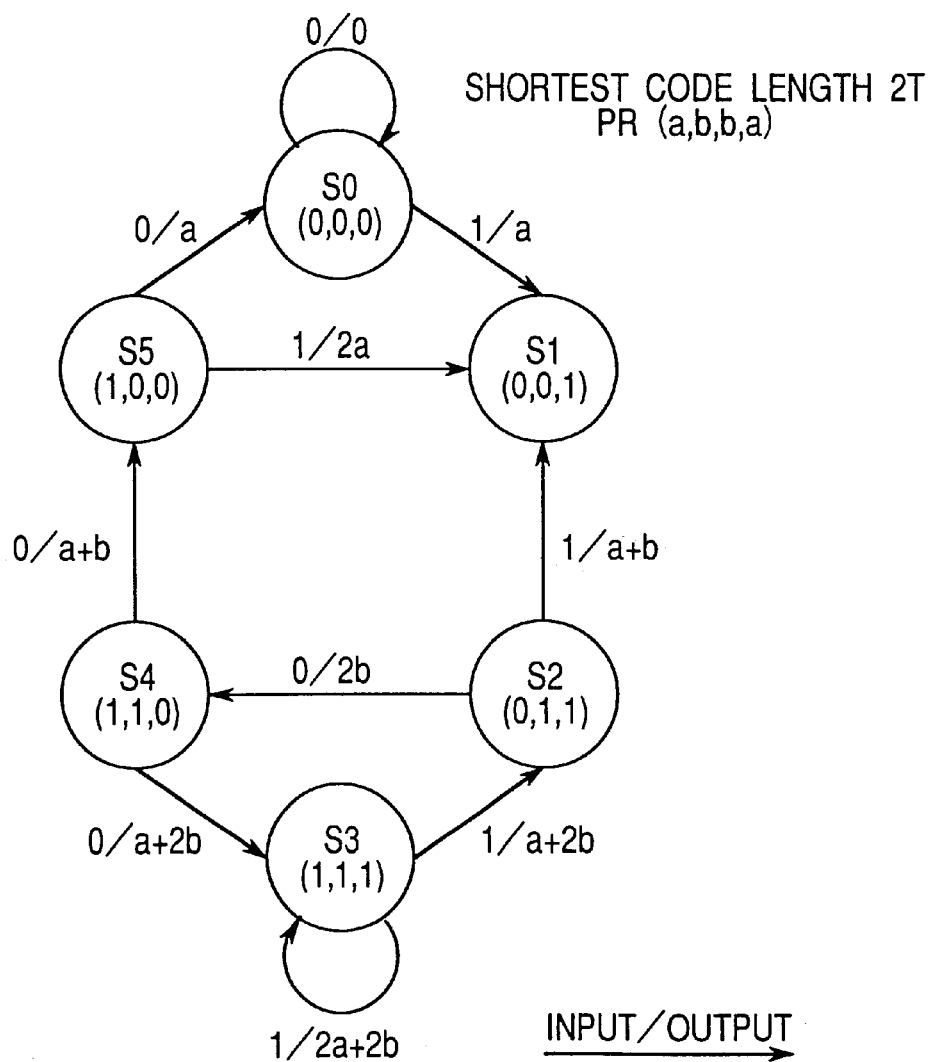
FIG. 11 is a state transition diagram of Viterbi decoder when code words, having minimum code length 2T, with PR (a, b, b, a) are adopted.

FIG. 11 shows a state transition diagram of Viterbi decoder 112 (FIG. 10) when code words, having minimum code length 2T, with PR (a, b, b, a) are adopted. When codeword of 2T minimum code length is used, since patterns of "010" and "101" do not exist in the coding group, the number of states is restricted to 6 and the number of paths is restricted to 10. When a signal level is calculated from this 6 states and 10 paths, an output for signal series input "0000" is "0", an output for input "0001" is "a", an output for input "0011" is "a+b", an output for input "0110" is "2b", an output for input "0111" is "a+2b", an output for input "1000" is "a", an output for input "1001" is "2a", an output for input "1100" is "a+b", an output for input "1110" is "a+2b", and an output for input "1111" is "2a+2b".

As a result, there are 7 levels exist for the output signal level, namely, "a," "a+b," "2a," "2b," "a+2b," and "2a+2b," and each level becomes the PR equalization target value described above. That is, coefficient adaptive controller 114 (FIG. 10) updates the tap of FIR equalizer 111 (FIG. 10) as is the case in which the input signal is equalized to the equalization target value. Equalization takes place by reducing difference (i.e. equalizing error) between an output signal of FIR equalizer 111 (FIG. 10) and a PR equalization target value.

Next, discussion will be made on the action of Viterbi decoder 112 (FIG. 10) with respect to the PR equalizing method described above. Viterbi decoder 112 (FIG. 10) does not carry out judgment of "0" or "1" (so-called hard judgment) at a certain threshold value with respect to the input data as is the case with the level detection system. Viterbi decoder 112 (FIG. 10) carries out judgment of the most probable data string (so-called soft judgment) based on the data strings digitized in the past.

Figure 12:
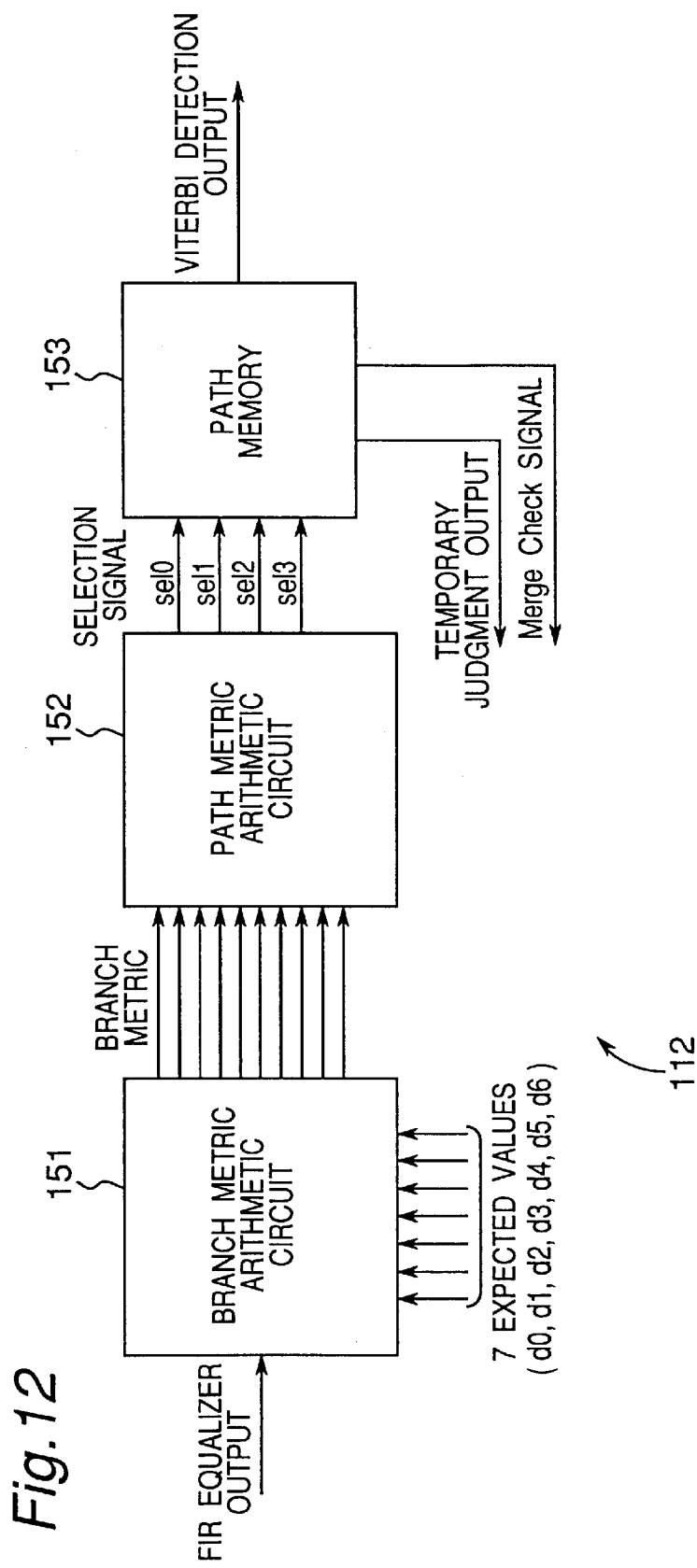
FIG. 12 is a block diagram of a specific configuration of the Viterbi decoder.

FIG. 12 is a block diagram of the specific configuration of Viterbi decoder 112. Viterbi decoder 112 generally includes a branch metric arithmetic circuit 151, path metric arithmetic circuit 152, and path memory 153. Branch metric arithmetic circuit 151 calculates branch metric which is square errors of signals entered from FIR equalizer 111 (FIG. 10) for respective channel clock (i.e. sample data) and 7 different expected values [d0, d1, d2, d3, d4, d5, d6] entered from coefficient adaptive controller 114 (FIG. 10). These 7 expected values correspond to signal levels of "0," "a,", "a+b," "2a," "2b," "a+2b," and "2a+2b," respectively. Specifically, branch metric arithmetic circuit 151 calculates branch metric BMk(i) by the following Eq. 2.

$$BMk(i)=(y_k-di)^2 \qquad (Eq. 2)$$

where, $y_k$ is the signal entered from FIR equalizer 111 (FIG. 10) (i.e. sample data) and di (i=0, 1, . . . , 6) are seven expected values [d0, d1, d2, d3, d4, d5, d6].

Then, path metric arithmetic circuit 152 cumulatively adds branch metrics by every 1 channel clock and calculates path metric. Specifically, path metric arithmetic circuit 152 calculate the path metric by the following Eq. 3.

$$PM_k^{S0}=\min[PM_{k-1}^{S0}+BM_k(0), PM_{k-1}^{S5}+BM_k(1)]$$

$$PM_k^{S1}=\min[PM_{k-1}^{S0}+BM_k(1), PM_{k-1}^{S5}+BM_k(2)]$$

$$PM_k^{S2}=PM_{k-1}^{S1}+BM_k(3)$$

$$PM_k^{S3}=\min[PM_{k-1}^{S3}+BM_k(6), PM_{k-1}^{S2}+BM_k(5)]$$

$$PM_k^{S4}=\min[PM_{k-1}^{S3}+BM_k(5), PM_{k-1}^{S2}+BM_k(4)]$$

$$PM_k^{S5}=PM_{k-1}^{S4}+BM_k(3) \qquad (Eq. 3)$$

In Eq. 3, "min" is a mathematical symbol. For example, min [a, b] indicates the smaller one in "a" and "b" (either one when a =b).

Path metric arithmetic circuit 152 calculates signals [sel0, sel1, sel2, sel3] for selecting data sequence in which path metric becomes the minimum, that is, which is the most probable, based on Eq. 4 through Eq. 7 and outputs results to path memory 153.

$$PM_{k-1}^{S0}+BM_k(0) \geq PM_{k-1}^{S5}+BM_k(1) \; Sel0=1$$

$$PM_{k-1}^{S0}+BM_k(0) < PM_{k-1}^{S5}+BM_k(1) \; Sel0=0 \qquad (Eq. 4)$$

$$PM_{k-1}^{S0}+BM_k(1) \geq PM_{k-1}^{S5}+BM_k(2) \; Sel1=1$$

$$PM_{k-1}^{S0}+BM_k(1) < PM_{k-1}^{S5}+BM_k(2) \; Sel1=0 \qquad (Eq 5)$$

$$PM_{k-1}^{S3}+BM_k(6) \geq PM_{k-1}^{S2}+BM_k(5) \; Sel2=1$$

$$PM_{k-1}^{S3}+BM_k(6) < PM_{k-1}^{S2}+BM_k(5) \; Sel2=0 \qquad (Eq. 6)$$

$$PM_{k-1}^{S3}+BM_k(5) \geq PM_{k-1}^{S2}+BM_k(4) \; Sel3=1$$

$$PM_{k-1}^{S3}+BM_k(5) < PM_{k-1}^{S2}+BM_k(4) \; Sel3=0 \qquad (Eq. 7)$$

Path memory 153 stores one or more specified candidate sequences and outputs the data string based on the selection signals [sel0, sel1, sel2, sel3] received from path metric arithmetic circuit 152. When memory length of path memory 153 in which the data string is stored is increased, the probability of correct selection increases, but conversely, if it is too long, the circuit scale increases. Consequently, correct selection probability and the circuit scale have a trade-off relation and are determined referring to the performance and the circuit scale. Furthermore, in the present embodiment, path memory 153 outputs the temporary judgment data sequence in the midway. The outputted temporary judgment data sequence is used for the temporary judgment value for judging the PR equalization target value.

Figure 13:
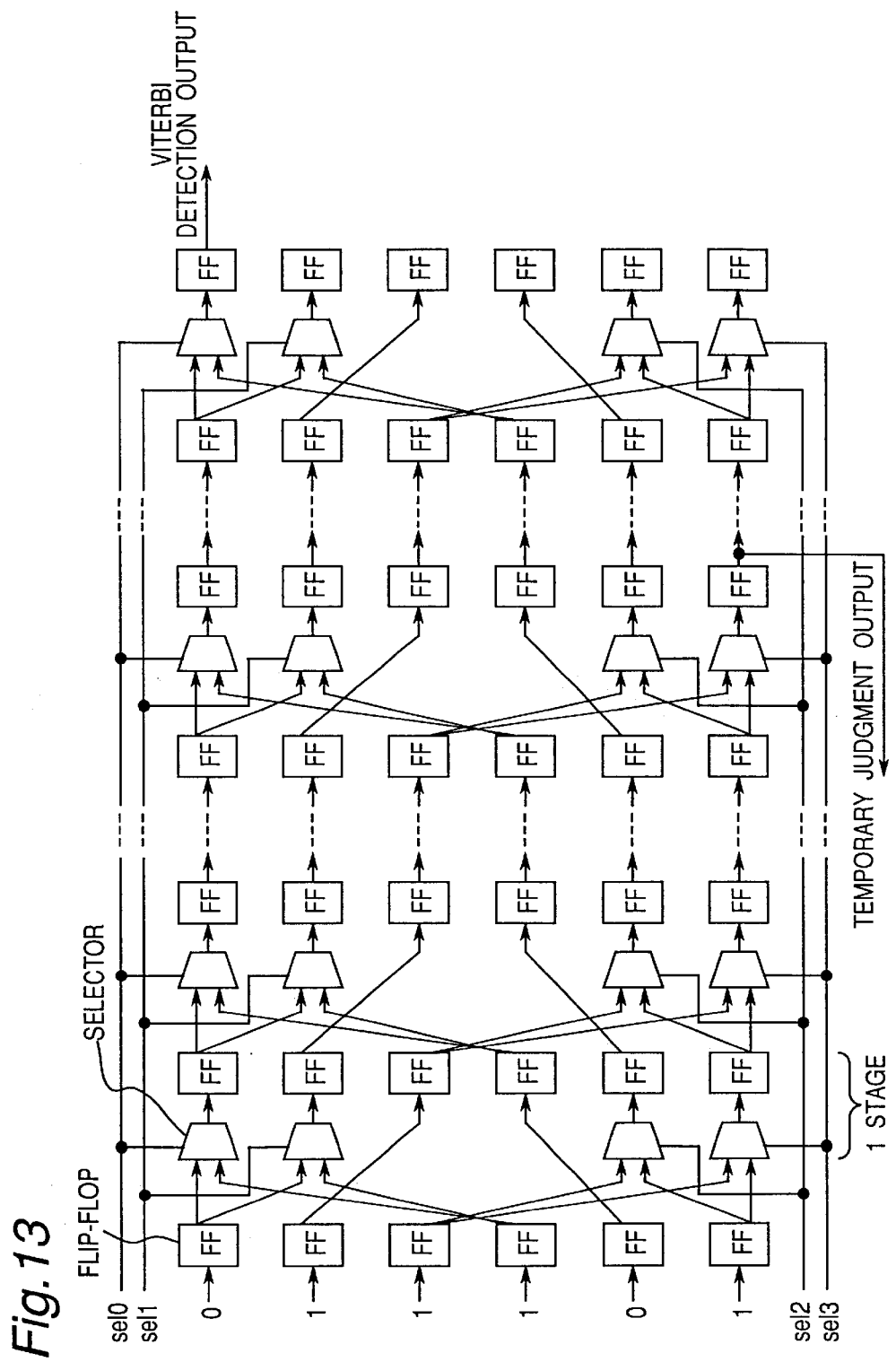
FIG. 13 is a circuit of the detailed configuration of path memory.

FIG. 13 is a circuit diagram of the detailed configuration of path memory 153 (FIG. 12). Path memory 153 includes a plurality of flip-flops (FFs) and selectors. Flip-flops FFs are state registers and are arranged in 6 pieces in the longitudinal direction of the figure and the number "6" corresponds to the number of states. The lateral direction corresponds to the memory length of path memory 153. Note that one set of four selectors and 6 flip-flops FF arranged in the longitudinal direction in the figure forms one stage. Path memory 153 (FIG. 12) is formed by 20 to 30 stages. Path memory 153 (FIG. 12) receives selection signals sel0, sel1, sel2, sel3 from path metric arithmetic circuit 152 (FIG. 12) and selects either data "0" or "1" entered in FF based on the received selection signals. In the figure, to the leftmost side flip-flops FF, [011101] are entered successively from the top as initial values. The selection signal is controlled to select the most probable path. As a result, the paths are combined together into one path and the output of flip-flop FF of each stage becomes same in a certain path memory length. That is, at the final stage, the output from any flip-flop FF is the same. The final output is outputted from Viterbi decoder 112 as the Viterbi detection output.

The path memory length that outputs the temporary judgment value sequence must be properly selected by combining the codeword used and PR. Specifically, it is essential to select the length that does not greatly degrade the error rate as compared to the final stage of the path memory in the Viterbi decoder. However, excessively long path memory length that outputs the sequence of temporary judgment values increases the delay of the feedback loop until the tap coefficient is updated. Consequently, in view of these two points, the path memory length that outputs the temporary judgment must be properly selected.

Now, discussion will be made on the method to facilitate the recovery when loop performance is degraded in the feedback system or the loop performance is likely to be degraded. According to this method, even if the error rate of the temporary judgment group from Viterbi decoder 112 (FIG. 10) in the present invention is increased, unstable operation of PRML detector 100 will be able to be prevented.

Figure 14:
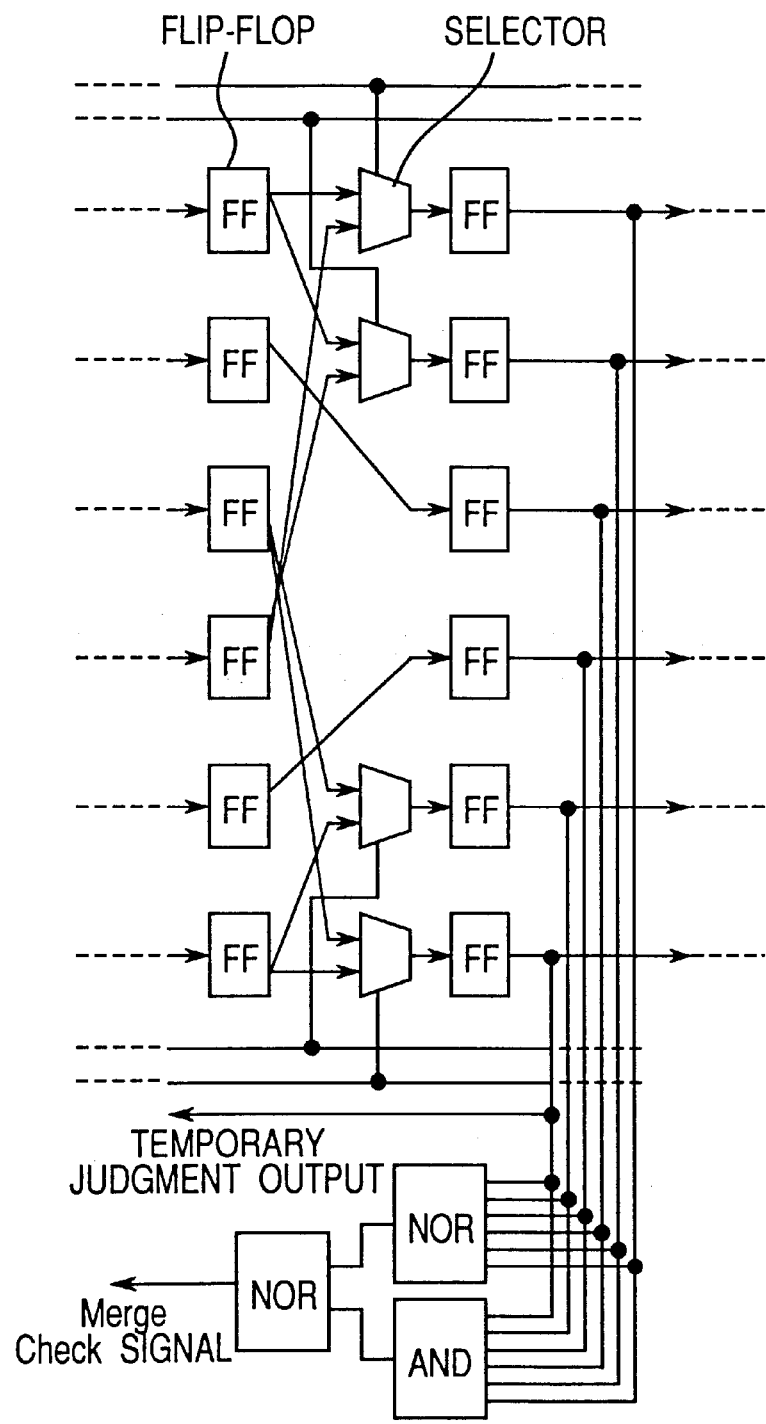
FIG. 14 is a block diagram of the detailed configuration of outputting temporary judgment in path memory of the Viterbi decoder.

FIG. 14 is a block diagram of the detailed configuration to carry out temporary judgment output (FIG. 13) in path memory 153 (FIG. 12) of Viterbi decoder 112. As already discussed, in Viterbi decoder 112 (FIG. 12), selecting the most probable paths draws the paths together to one path. That is, in a flip-flop FF (a state register) before path memory 153 (FIG. 12) is all finished to be transferred, the output of flip-flop FF is converged to one same value, which is called "merged." However, there is a case in which the paths are not drawn together even though the most probable paths are selected, that is, there is a case in which the output of flip-flop FF is not converged. In such event, flip-flop FF is in the condition to hold a plurality of candidate paths, which is called "not merged." When the output is not merged, flip-flop FF continues transferring the output, and this condition increases the possibility of mistaking temporary judgment output and the final output (Viterbi detected output) of Viterbi decoder 112 (FIG. 12).

Therefore, in the embodiment, the merge check signal indicating whether merged or not is outputted. FIG. 14 is a diagram of a circuit for outputting the merge check signal, formed by the use of two NOR circuits and an AND circuit. The output of six flip-flops FFs of the specified stage is entered in the first NOR circuit and the AND circuit, respectively, and the output is entered in the second NOR. The merge check signal is obtained as the output from the second NOR circuit. The merge check signal becomes of the low level when the output is merged, and when the output is not merged, it becomes of the high level.

Figure 19:
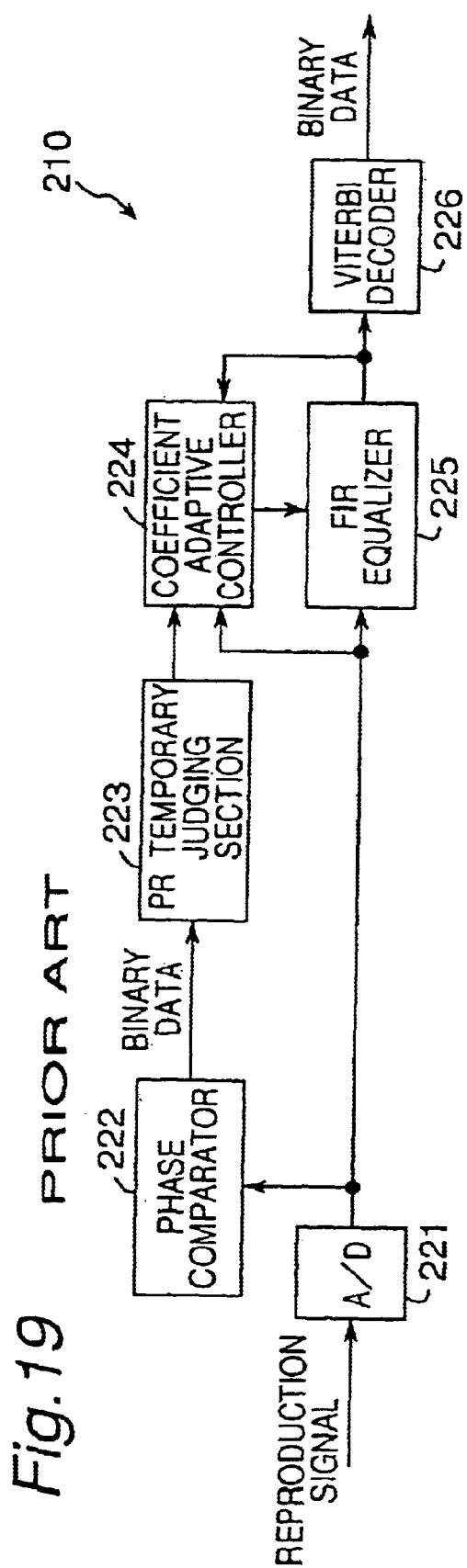
FIG. 19 is a block diagram of the configuration of the PRML detector.
Figure 20:
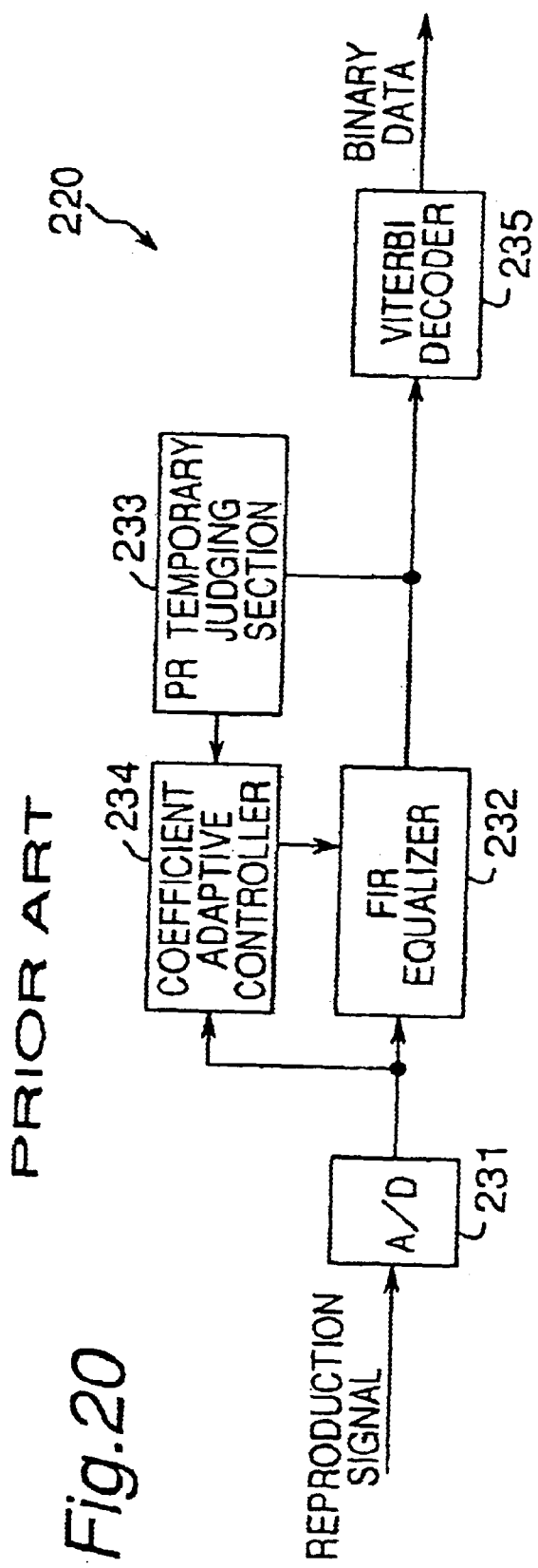
FIG. 20 is a block diagram of the configuration of the PRML detector.

As shown in FIG. 10, coefficient adaptive controller 114 (FIG. 10) may determine whether the temporary judgment sequence is fed back or not by the use of the merge check signal. For example, when the merge check signal is of a high level or when the frequency of achieving the high level in one channel clock section exceeds a specified value, coefficient adaptive controller 114 (FIG. 10) may stop updating the tap coefficient or may reset (initialize) the tap coefficient to the specified initial value. Furthermore, it may be changed over to return to the processing by conventional feed-forward (FIG. 19). Furthermore, in this case, the binary-coded data outputted from phase comparator 222 (FIG. 19) may be outputted as it is as the final binary-coded data so that PRML detection does not take place. Or processing may be changed over to the processing method (FIG. 20) that further reduces the feedback delay. Further fail-safe measures are achieved by changing the utilized circuit and the output in accordance with the merge check signal.

Referring now again to FIG. 10, how the PR equalization target value judging section 13 judges the desired PR target value based on the temporary judgment output of Viterbi decoder 112 will be discussed. In this case, PR (a, b, b, a) described above is taken for an example, and the PR equalization target value judging section 13 determines the PR target value based on the state transition diagram (FIG. 11) in which the minimum code length is determined by 2T codeword and PR (a, b, b, a).

To be more specific, the PR equalization target value judging section 113 is equipped with a 4-channel-bit table. The value of each channel bit is a temporary judgment output value from Viterbi decoder 12. In the table, the corresponding relationships between the input values and the output values are defined on the basis of the state transition diagram (FIG. 11). That is, the table is defined to recite the following relationships:

the PR target value for the case of "0000" is "0",
the PR target value for the case of "0001" is "a",
the PR target value for the case of "0011" is "a+b",
the PR target value for the case of "0110" is "2b",
the PR target value for the case of "0111" is "a+2b",
the PR target value for the case of "1000" is "a",
the PR target value for the case of "1001" is "2a",
the PR target value for the case of "1100" is "a+b",
the PR target value for the case of "1110" is "a+2b", and
the PR target value for the case of "1111" is "2a+2b".

Figure 15:
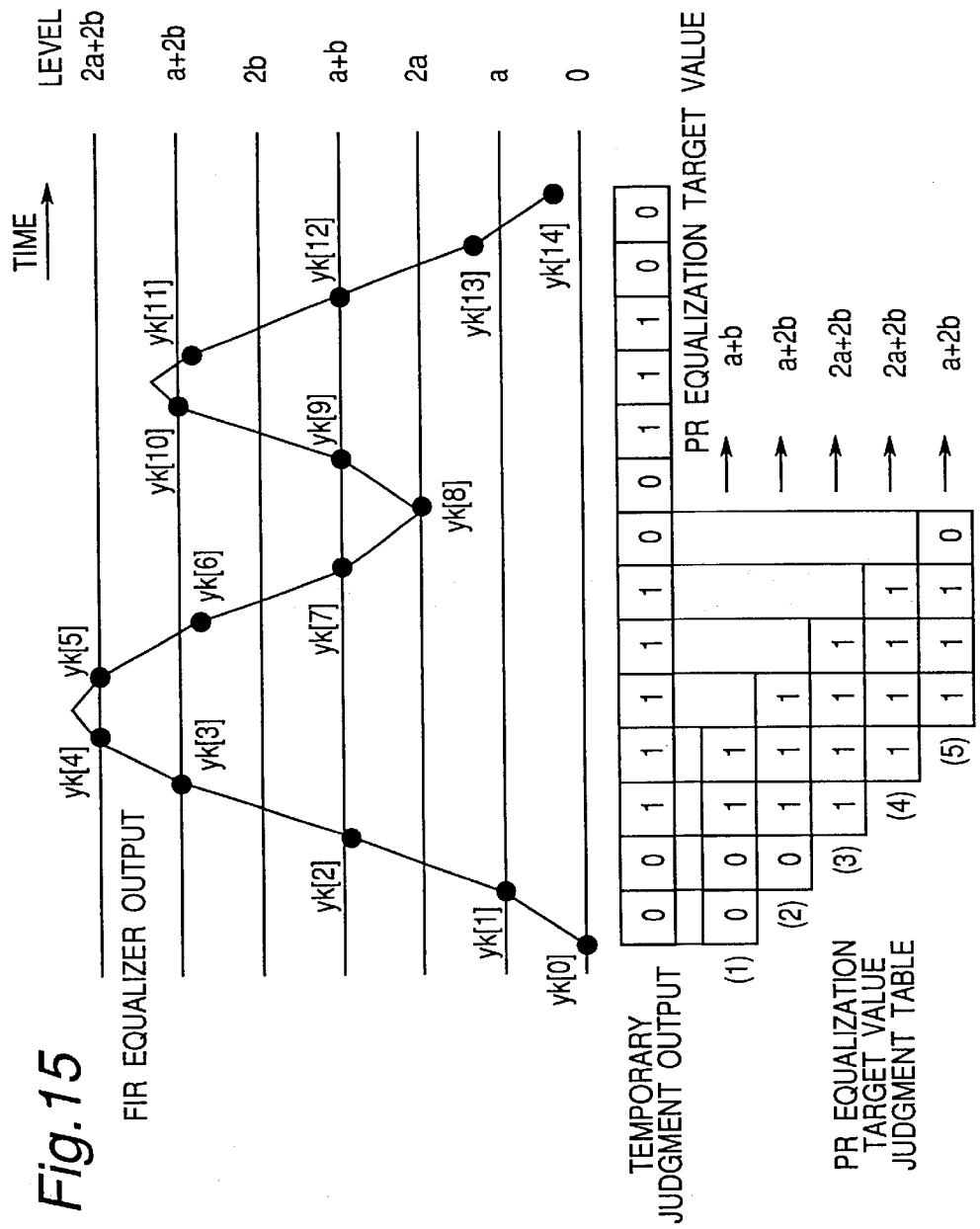
FIG. 15 is a diagram describing the output of the FIR equalizer and the procedure for determining PR equalizing desired value.

FIG. 15 illustrates outputs of FIR equalizer 111 (FIG. 1) and a deciding procedure of the PR equalization target value. The output of FIR equalizer 111 (FIG. 1) is the signal waveform when 5T mark, 2T space, and 3T mark are read, and let yk[0] through yk[14] denote sampling value for each channel clock. On the other hand, let "00111110011100" denote temporary judgment outputs from Viterbi decoder 112 (FIG. 10) obtained on the basis of the outputs of FIR equalizer 111 (FIG. 1). According to the table above and the temporary judgment output, PR equalization target value judging section 113 (FIG. 10) judges that (1) the PR target value for "0011" of the first to fourth bits is "a+b",
(2) the PR target value for "0111" of the second to fifth bits is "a+2b",
(3) the PR target value for "1111" of the third to sixth bits is "2a+2b",
(4) the PR target value for "1111" of the fourth to seventh bits is "2a+2b", and
(5) the PR target value for "1110" of the fifth to eighth bits is "a+2b".

The PR equalization target value judging section 113 (FIG. 10) decides the PR target value of (1) as the target value for the FIR equalizer output yk[2]. In addition, the PR equalization target value judging section 113 (FIG. 10) decides the PR target value (2) as the target value for yk[3]. Similarly, as the target value for yk[4], the PR target value of (3) and as the target value for yk[5], the PR target value of (4), and as the target value for yk[6], the PR target value of (5), and as the target value for yk[7], the PR target value of (5) are decided.

Coefficient adaptive controller 114 (FIG. 10) updates taps of FIR equalizer 111 (FIG. 10) in such a manner that the input signal is equalized to the equalization target value, that is, the equalizing error is reduced. The equalizing error can be found from the difference between the PR equalization target value and the output value of FIR equalizer 111 (FIG. 10) against the PR equalization target value.

Note that, if any sequence that does not fit to the state transition rule (FIG. 11) is entered when the PR equalization target value is decided by the PR equalization target value judging section 113 (FIG. 10), it can be judged apparently an error in the temporary judgment group. In such event, PR equalization target value judging section 113 (FIG. 10) instructs coefficient adaptive controller 114 (FIG. 10) to stop updating the tap coefficients of FIR equalizer 111 (FIG. 10). Stopping updating of the tap coefficients can avoid erroneous tap updating.

As described above, embodiments 1 and 2 according to the present invention were discussed. Embodiment 1 reduces errors at the time of data decoding caused by the asymmetry of the physical profile of the mark on the recording medium. On the other hand, embodiment 2 improves the accuracy of the temporary judgment when coefficients of the FIR equalizer are adaptively controlled and reduces errors at the time of data decoding. Because the inventions according to embodiments 1 and 2 intend to reduce errors resulting from different causes, both inventions can be combined. Specifically, to FIR equalizer 111 of FIG. 10, asymmetry detector 15, polarity discriminator 16, and coefficient C selector 17 of FIG. 2 should be incorporated. Thus, effects of both embodiments 1 and 2 can be obtained and at the same time errors at the time of decoding can be further suppressed to a low level.

The present invention was described using specific exemplary embodiments. For those skilled in the art, many different modifications and improvements would be apparent. Consequently, the embodiments described above shall not restrict the scope of the present invention as specified by the claims attached.

What is claimed is:

1. A waveform equalizer that equalizes a waveform of a reproduction signal obtained by reproducing marks and non-marks recorded on a recording medium, comprising:

a delay element that delays a propagation of the reproduced signal;

a plurality of multipliers that multiply predetermined coefficients by the reproduction signal and the delayed signal from the delay element;

a coefficient learning circuit that adaptively updates the predetermined coefficients for each of the plurality of multipliers; and an adder that adds outputs from the plurality of multipliers, said coefficient learning circuit comprising:

a teaching signal generator that generates a teaching signal that serves as an equalizing target;

an error detector that detects an error between an output signal having an impulse response of (a, b, b, a) characteristics and the teaching signal generated by the teaching signal generator;

a discriminator that discriminates the marks and the non-marks based on the reproduction signal to output a discriminating signal;

a plurality of registers that update and output the predetermined coefficients so that a mean square of the error becomes minimum, said plurality of registers including a first register that holds a first coefficient multiplied by the reproduction signal of the marks and a second register that holds a second coefficient multiplied by the reproduction signal of the non-marks, which is different from the first coefficient; and a register selector that selects one of the first coefficient held in the first register and the second coefficient held in the second registers based on the discriminating signal outputted from the discriminator.

2. The waveform equalizer according to claim 1, wherein a number of the predetermined coefficients is odd, and wherein each of the first coefficient and the second coefficient selected by the selector is used as a center coefficient.

3. The waveform equalizer according to claim 1, wherein said impulse response of the waveform equalizer is determined based on the predetermined coefficients, and wherein each absolute value of the first coefficient and the second coefficient is greater than each absolute value of other predetermined coefficients.

* * * * *

UNITED STATES PATENT AND TRADEMARK OFFICE
CERTIFICATE OF CORRECTION

PATENT NO.    : 6,678,230 B2
DATED         : January 13, 2003
INVENTOR(S)   : H. Miyashita et al.

It is certified that error appears in the above-identified patent and that said Letters Patent is hereby corrected as shown below:

Column 20,
Line 9, "registers" should be -- register, --.

Signed and Sealed this

Sixth Day of July, 2004

JON W. DUDAS
*Acting Director of the United States Patent and Trademark Office*